US009318758B2

(12) United States Patent
Shinohara et al.

(10) Patent No.: US 9,318,758 B2
(45) Date of Patent: Apr. 19, 2016

(54) SOFC STACK WITH TEMPERATURE ADAPTED COMPRESSION FORCE MEANS

(75) Inventors: Masashi Shinohara, Saitama (JP); Keiji Tsukamoto, Wako (JP); Hideo Urata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 122 days.

(21) Appl. No.: 14/131,752

(22) PCT Filed: Jun. 26, 2012

(86) PCT No.: PCT/JP2012/066829
§ 371 (c)(1),
(2), (4) Date: Jan. 9, 2014

(87) PCT Pub. No.: WO2013/008655
PCT Pub. Date: Jan. 17, 2013

(65) Prior Publication Data
US 2014/0141351 A1    May 22, 2014

(30) Foreign Application Priority Data

Jul. 13, 2011    (JP) .................................. 2011-155006

(51) Int. Cl.
*H01M 8/04*    (2006.01)
*H01M 8/12*    (2006.01)
*H01M 8/24*    (2006.01)

(52) U.S. Cl.
CPC ............ *H01M 8/04201* (2013.01); *H01M 8/12* (2013.01); *H01M 8/248* (2013.01);
(Continued)

(58) Field of Classification Search
CPC ... H01M 8/04201; H01M 8/12; H01M 8/248; H01M 8/2425; H01M 8/2475; H01M 8/249; Y02E 60/525; Y02E 60/521
See application file for complete search history.

(56) References Cited

U.S. PATENT DOCUMENTS 7,628,951 B1 *   12/2009   Akash et al. ................... 264/603
2002/0155335 A1 *   10/2002   Kearl .............................. 429/30
(Continued)

FOREIGN PATENT DOCUMENTS

| JP | 2006-339035 | 12/2006 |
| JP | 2007-073359 | 3/2007 |

(Continued)

OTHER PUBLICATIONS

Joo et al. et al. (Electrochemical and Solid-State Letters, Jan. 4, 2010 vol. 13 No. 3 pp. B17-B20).*

(Continued)

*Primary Examiner* — Patrick Ryan
*Assistant Examiner* — Aaron Greso
(74) *Attorney, Agent, or Firm* — Rankin, Hill & Clark LLP

(57) ABSTRACT

A fuel cell stack includes a lower end plate for placing a stack body on the lower end plate, a load plate for applying a load to the stack body in a stacking direction, and a fuel cell support member provided between the load plate and the stack body. The fuel cell support member includes composite layers made of composite material of alumina fiber and vermiculite. The fuel cell support member includes a first support section for applying a load to sandwiching sections at a position corresponding to electrolyte electrode assemblies, and a second support section for applying a load to reactant gas supply sections in the stacking direction. The density of the first support section is smaller than the density of the second support section.

8 Claims, 17 Drawing Sheets

(52) U.S. Cl.
CPC ............ *H01M8/2425* (2013.01); *H01M 8/249* (2013.01); *H01M 8/2475* (2013.01); *Y02E 60/521* (2013.01); *Y02E 60/525* (2013.01)

(56) References Cited

U.S. PATENT DOCUMENTS

| | | | | |
|---|---|---|---|---|
| 2008/0182152 | A1* | 7/2008 | Erikstrup | 429/34 |
| 2009/0114531 | A1 | 5/2009 | Rasten et al. | |
| 2010/0297521 | A1* | 11/2010 | Ogawa et al. | 429/456 |
| 2013/0183598 | A1* | 7/2013 | Shinohara | 429/423 |
| 2014/0134515 | A1* | 5/2014 | Shinohara et al. | 429/465 |

FOREIGN PATENT DOCUMENTS

| | | |
|---|---|---|
| JP | 2009-500525 | 1/2009 |
| WO | WO 2009/093622 * | 7/2009 ............ H01M 8/24 |
| WO | WO 2010/102815 * | 9/2010 ............ H01M 8/24 |
| WO | 2012/073640 | 6/2012 |

OTHER PUBLICATIONS

ZRCI (ZRCI technical bulletin Properties and Characteristics Chart and introduction section Jul. 2005 self-published ZIRCAR Refractory Composites Inc. Bull. No. ZRCI-428).*

Straube (Heat Flow Basics Univ. of Waterloo Building Materials online Wayback Machine evidence Feb. 29, 2004 {http://www.civil.uwaterloo.ca/beg/arch264/arch264%20heat%20flow%20basics.pdf}).*

* cited by examiner

SOFC STACK WITH TEMPERATURE ADAPTED COMPRESSION FORCE MEANS

TECHNICAL FIELD

The present invention relates to a fuel cell stack including a stack body formed by stacking a plurality of solid oxide fuel cells. Each of the solid oxide fuel cells is formed by stacking an electrolyte electrode assembly between separators. The electrolyte electrode assembly includes an anode, a cathode, and an electrolyte interposed between the anode and the cathode.

BACKGROUND ART

Typically, solid oxide fuel cells (SOFC) employ an electrolyte of ion-conductive oxide such as stabilized zirconia. The electrolyte is interposed between an anode and a cathode to form an electrolyte electrode assembly (MEA). The electrolyte electrode assembly is interposed between a pair of separators (bipolar plates). In use, generally, a predetermined numbers of the separators and the electrolyte electrode assemblies are stacked together to form a fuel cell stack.

In a fuel cell stack, in order to obtain the output voltage efficiently, the fuel cells need to be stacked together under the desired pressure. Further, in order to prevent leakage of the reactant gas such as the fuel gas and the air as much as possible, reactant gas manifolds need to be sealed reliably by applying pressure to the reactant gas manifolds in the stacking direction.

In this regard, for example, as shown in FIG. 16, a flat plate type solid oxide fuel cell disclosed in Japanese Laid-Open Patent Publication No. 2006-339035 (hereinafter referred to as the conventional technique 1) includes a cell stack 1a and four manifolds M1 to M4 provided around the cell stack 1a. A fuel gas and an oxygen-containing gas are supplied to, and discharged from each of unit cells 2a through the manifolds M1 to M4.

A first pressure applying mechanism 3a applies pressure to the cell stack 1a, and a second pressure applying mechanism 4a applies pressure to the manifolds M1 to M4. The first pressure applying mechanism 3a includes a compression spring 5a as pressure applying means, and the second pressure applying mechanism 4a includes a compression spring 6a as pressure applying means.

Further, in a fuel cell disclosed in Japanese Laid-Open Patent Publication No. 2007-073359 (hereinafter referred to as the conventional technique 2), as shown in FIG. 17, a large number of units 3b each formed by sandwiching a power generation cell 1b between a pair of separators 2b are stacked together. At both ends (upper and lower ends) in the stacking direction of the fuel cell, an upper tightening plate 4b and a lower tightening plate 5b are provided. A large circular hole 6b is formed at the center of the upper tightening plate 4b. The circular hole 6b is larger than the outer shape of the power generation cell 1b, and a weight 7b is placed in the circular hole 6b.

The upper tightening plate 4b and the lower tightening plate 5b are tightened together by a plurality of bolts 8b to apply a tightening load in the stacking direction to the units 3b. By a load applied by the weight 7b, a plurality of power generating elements of the units 3b tightly contact each other.

Further, a cell stack disclosed in Japanese Laid-Open Patent Publication No. 2009-500525 (PCT) (hereinafter referred to as the conventional technique 3) includes at least one electrochemical cell interposed between a first end plate connected to an electrically conductive bolt and a second end plate connected to another electrically conductive bolt.

The cell stack includes a housing, means for fixing the cell stack to this housing to support the cell stack, and means for applying a mechanical load at a constant level to the entire fuel cell stack. The means for applying the load at the constant level includes at least one elastic pad inserted into a space between the cell stack and a wall of the housing. For example, the elastic pad is a silicone pad, and has insulating property.

SUMMARY OF INVENTION

In the conventional technique 1, the operating temperature of the fuel cell is considerably high. Therefore, the compression spring 5a of the first pressure applying mechanism 3a for applying the pressure to the cell stack 1a needs to be made of ceramics material having resistance to high temperature such as silicon nitride. Therefore, the cost for producing the first pressure applying mechanism 3a is high.

Further, since a ceramics spring is used as the compression spring 5a, for example, the compression spring 5a can be damaged easily. Also, heat radiation from an upper portion of the stack is large.

Further, in the conventional technique 2, the weight 7b is provided in the circular hole 6b formed at the center of the upper tightening plate 4b. In the structure, the fuel cell becomes considerably large and heavy as a whole.

Further, since the heat capacitance of the weight 7b is large, load following capability during starting operation of the fuel cell, and during changes in the load for the fuel cell is poor. Therefore, such changes in the operation condition cannot be handled promptly. Moreover, since the weight 7b is made of metal having large heat conductivity, by heat transfer, heat radiation from an upper portion of the fuel cell is large.

Further, in the conventional technique 3, the elastic pad is made of resin material such as silicone or polymer material. Therefore, heat resistance property of the material of the elastic pad is poor. Thus, the techniques of the conventional technique 3 cannot be suitably applied to, especially, the solid oxide fuel cell operated at high temperature.

The present invention solve the problems of this type, and an object of the present invention is to provide a fuel cell stack having simple and compact structure in which it is possible to reliably apply a desired tightening load to each of different portions in a solid oxide fuel cell, suppress heat radiation, and carry out highly efficient power generation.

The present invention relates to a fuel cell stack including a stack body formed by stacking a plurality of solid oxide fuel cells in a stacking direction. Each of the solid oxide fuel cells is formed by stacking an electrolyte electrode assembly between separators. The electrolyte electrode assembly includes an anode, a cathode, and an electrolyte interposed between the anode and the cathode.

In the fuel cell stack, the separator includes a sandwiching section for sandwiching the electrolyte electrode assembly and a reactant gas supply section. A fuel gas channel for supplying a fuel gas along an electrode surface of the anode and an oxygen-containing gas channel for supplying an oxygen-containing gas along an electrode surface of the cathode are formed separately in the sandwiching section. At least a fuel gas supply passage for supplying the fuel gas to the fuel gas channel or an oxygen-containing gas supply passage for supplying the oxygen-containing gas to the oxygen-containing gas channel extends through the reactant gas supply section in the stacking direction.

The fuel cell stack includes a base member provided at one end of the stack body in the stacking direction, a mounting member provided at another end of the stack body in the stacking direction for applying a load to the stack body in the stacking direction, and a fuel cell support member positioned between the mounting member and the stack body. The fuel cell support member includes composite material of alumina fiber and vermiculite.

The fuel cell support member includes a first support section for applying a load to the sandwiching section in the stacking direction at a position corresponding to the electrolyte electrode assembly, and a second support section for applying a load to the reactant gas supply section in the stacking direction. The density of the first support section is smaller than the density of the second support section.

According to the present invention, the alumina fiber is elastic, and has good durability at high temperature, good heat insulating property and good electrically insulating property. Vermiculite has a high expansion coefficient at high temperature. Thus, the composite layer has good heat resistance property, good heat insulating property, and good heat expansion property, and it becomes possible to reliably apply the desired tightening load to the stack body because the tightening load can be easily adjusted in correspondence with the change in the temperature of the fuel cell stack. Thus, the stacking load applied to the fuel cell stack is stabilized, and improvement in the power generation performance is achieved.

Further, heat radiation from the fuel cell stack is suitably suppressed, and thermally self-sustaining operation can be facilitated. The thermally self-sustaining operation herein means suitable operation of the fuel cell only using the heat generated by the fuel cell itself, without requiring any heat supplied from the outside.

Further, the density of the first support section which applies the load to the sandwiching section in the stacking direction at the position corresponding to the electrolyte electrode assembly is smaller than the density of the second sandwiching section which applies the load to the reactant gas supply section in the stacking direction. In the structure, since a relatively large load is applied to the fuel gas supply section, the desired sealing performance of the fuel gas supply section is maintained. In the meanwhile, a relatively small load enough to achieve tight contact between the electrolyte electrode assemblies and the sandwiching sections is applied to the electrolyte electrode assemblies. Therefore, damages of the electrolyte electrode assemblies can be prevented as much as possible, and power generation and current collection can be performed efficiently.

Thus, it becomes possible to provide a fuel cell stack having simple and compact structure in which it is possible to reliably apply respective desired tightening loads to different portions in a solid oxide fuel cell, and suppress heat radiation for achieving highly efficient operation.

DESCRIPTION OF EMBODIMENTS

Figure 1:
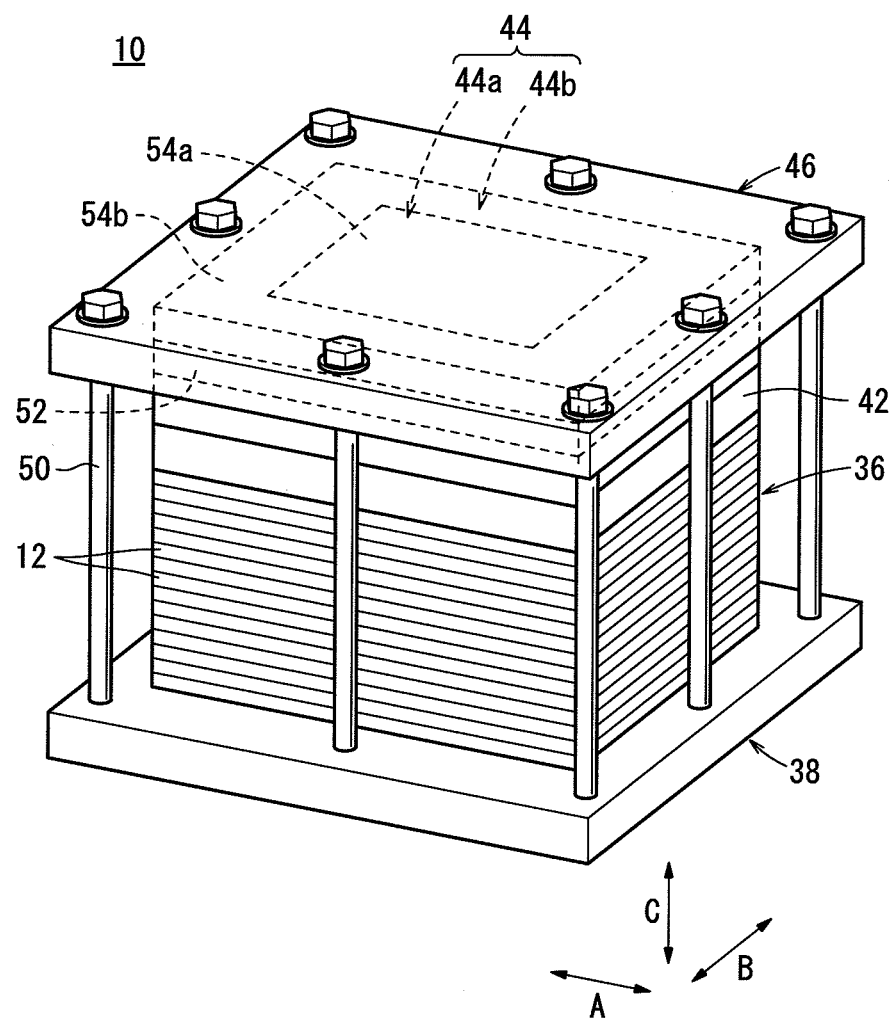
FIG. 1 is a perspective view schematically showing a fuel cell stack according to a first embodiment of the present invention.
Figure 2:
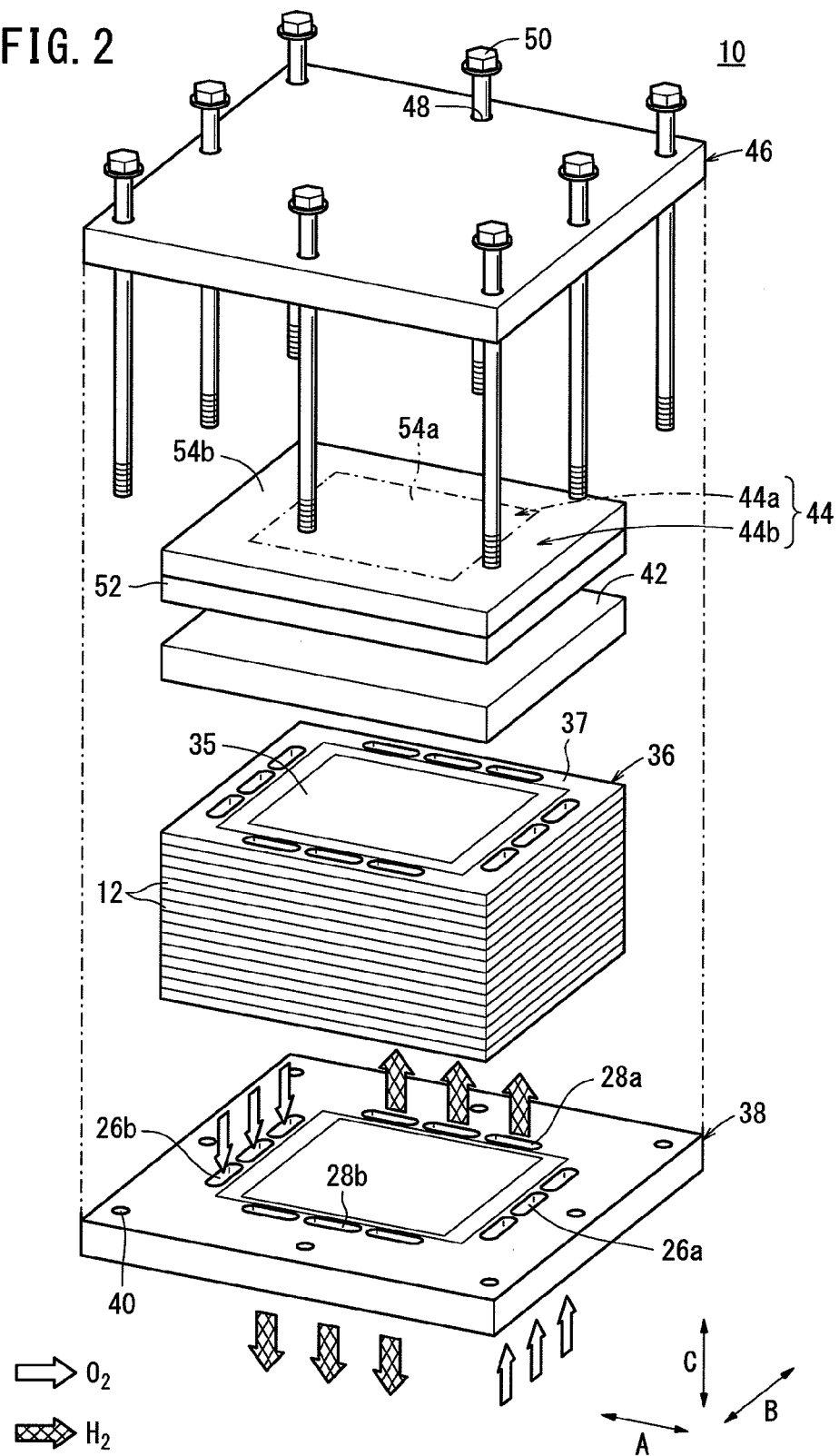
FIG. 2 is a partially-exploded perspective view showing the fuel cell stack.

As shown in FIGS. 1 and 2, a fuel cell stack 10 according to a first embodiment of the present invention is formed by stacking a plurality of solid oxide fuel cells 12 in a vertical direction indicated by an arrow C. The fuel cell stack 10 is used in various applications, including stationary and mobile applications. For example, the fuel cell stack 10 is mounted on a vehicle. The solid oxide fuel cell 12 performs power generation by electrochemical reactions of a fuel gas (hydrogen-containing gas such as a mixed gas of hydrogen gas, methane, and carbon monoxide) and an oxygen-containing gas (air).

Figure 3:
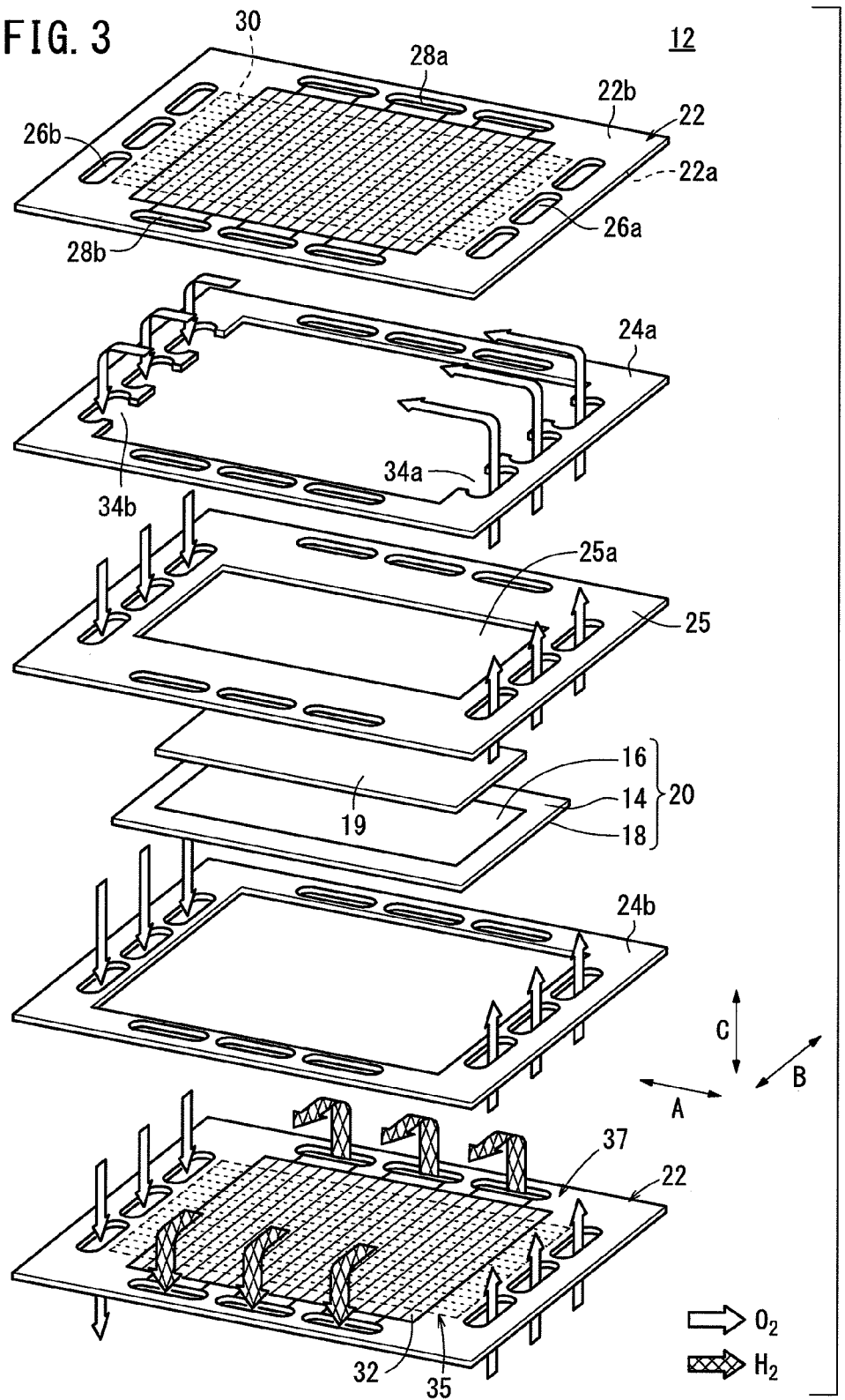
FIG. 3 is an exploded perspective view showing a solid oxide fuel cell of the fuel cell stack.

As shown in FIG. 3, a solid oxide fuel cell 12 includes electrolyte electrode assemblies 20. Each of the electrolyte electrode assembly (MEA) 20 includes a cathode 16, an anode 18, and an electrolyte (electrolyte plate) 14 interposed between the cathode 16 and the anode 18. For example, the electrolyte 14 is made of ion-conductive oxide such as stabilized zirconia.

The electrolyte electrode assembly 20 is an anode support type cell in which the thickness of the anode 18 is larger than the thickness of the cathode 16 and the electrolyte 14. The surface area of the cathode 16 is smaller than the surface area of the electrolyte 14. A current collector 19 is stacked on the cathode 16. The current collector 19 has substantially the same size as the cathode 16. For example, the current collector 19 is in the form of foamed metal or metal mesh containing metal such as nickel.

The electrolyte electrode assembly 20 has a rectangular shape or a square shape, and a barrier layer (not shown) is provided at least at the outer edge of the electrolyte electrode assembly 20 for preventing the entry or discharge of the oxygen-containing gas and the fuel gas.

The solid oxide fuel cell 12 includes a single electrolyte electrode assembly 20 sandwiched between a pair of separators (interconnectors) 22. Further, seal members 24a, 24b and a metal plate 25 are interposed between the separators 22 and the electrolyte electrode assembly 20. For example, each of the separators 22 is a metal plate of, e.g., stainless alloy. For example, mica material, ceramic material or the like, i.e., crustal component material, glass material, and composite material of clay and plastic may be used for the seal members 24a, 24b.

The metal plate 25 has a frame shape. An opening 25a formed inside the metal plate 25 is larger than the cathode 16, and smaller than the electrolyte 14. A wall around the opening 25a of the metal plate 25 is stacked on a portion around the electrolyte 14 to have a gas sealing function between the cathode 16 and the anode 18.

The separator 22 has a rectangular shape or a square shape. At one end of the separator 22 in a longitudinal direction indicated by an arrow A, a plurality of, e.g., three oxygen-containing gas supply passages 26a are arranged in a lateral direction indicated by an arrow B. At the other end of the separator 22 in the longitudinal direction indicated by the arrow A, a plurality of, e.g., three oxygen-containing gas discharge passages 26b are arranged in the direction indicated by the arrow B.

At one end of the separator 22 in the lateral direction indicated by the arrow B, for example, three fuel gas supply passages 28a are arranged in the direction indicated by the arrow A. At the other end of the separator 22 in the lateral direction, for example, three fuel gas discharge passages 28b are arranged in the direction indicated by the arrow A.

Conversely to the above described structure, three fuel gas supply passages 28a and three fuel gas discharge passages 28b may be provided on both sides in the longitudinal direction of the separator 22, and three oxygen-containing gas supply passages 26a and three oxygen-containing gas discharge passages 26b may be provided on both sides in the lateral direction of the separator 22.

The separator 22 has an oxygen-containing gas channel 30 on its surface 22a facing the cathode 16 of the electrolyte electrode assembly 20 for supplying the oxygen-containing gas along the electrode surface of the cathode 16. The oxygen-containing gas channel 30 includes a plurality of flow grooves extending in the direction indicated by the arrow A. Both ends of the oxygen-containing gas channel 30 are terminated adjacent to the oxygen-containing gas supply passages 26a and the oxygen-containing gas discharge passages 26b.

The separator 22 has a fuel gas channel 32 on its surface 22b facing the anode 18 of the electrolyte electrode assembly 20 for supplying a fuel gas along the electrode surface of the anode 18.

The fuel gas channel 32 includes a plurality of flow grooves extending in the direction indicated by the arrow B. Both ends of the fuel gas channel 32 are connected to the fuel gas supply passages 28a and the fuel gas discharge passages 28b.

The oxygen-containing gas supply passages 26a, the oxygen-containing gas discharge passages 26b, the fuel gas supply passages 28a, and the fuel gas discharge passages 28b are formed in the seal members 24a, 24b. Inlet connection channels 34a for connecting the oxygen-containing gas supply passage 26a and the oxygen-containing gas channel 30 and outlet connection channels 34b for connecting the oxygen-containing gas discharge passage 26b and the oxygen-containing gas channel 30 are formed in the seal member 24a, 24b.

The electrolyte electrode assembly 20 is sandwiched between the separators 22. Each of the separators 22 includes a sandwiching section 35 and a reactant gas supply section 37.

The fuel gas channel 32 and the oxygen-containing gas channel 30 are provided separately on the sandwiching section 35. The oxygen-containing gas supply passage 26a, the oxygen-containing gas discharge passage 26b, the fuel gas supply passage 28a, and the fuel gas discharge passage 28b extend through the reactant gas supply section 37 in the stacking direction.

As shown in FIGS. 1 and 2, a plurality of the solid oxide fuel cells 12 are stacked together in the direction indicated by the arrow C to form a stack body 36. The stack body 36 is placed on a lower end plate (base member) 38 positioned at a lower end (one end) of the stack body 36 in the stacking direction indicated by the arrow C.

The dimensions of the lower end plate 38 in the directions indicated by the arrows A and B are larger than the dimensions of the stack body 36 in the directions indicated by the arrows A and B. The oxygen-containing gas supply passages 26a, the oxygen-containing gas discharge passages 26b, the fuel gas supply passages 28a, and the fuel gas discharge passages 28b are formed in the lower end plate (see FIG. 2).

A plurality of screw holes 40 are formed along the marginal portion of the lower end plate 38. For example, the screw holes 40 are formed adjacent four corners of the lower end plate 38, and substantially central positions of the respective sides. Though not shown, manifolds for supplying and discharging the oxygen-containing gas and the fuel gas are attached to the lower end plate 38.

An upper end plate 42 is provided at an upper end (other end) of the stack body 36 in the stacking direction. The dimensions of the upper end plate 42 in the directions indicated by the arrows A and B are the same as the dimensions of the stack body 36 in the directions indicated by the arrows A and B. The upper end plate 42 is a flat rectangular or square plate.

A fuel cell support member 44 and a load plate (mounting member) 46 are stacked on the upper end plate 42. Holes 48 are formed along the marginal portion of the load plate 46, and bolts 50 are inserted into the holes 48. The bolts 50 are screwed into the screw holes 40 of the lower end plate 38.

The fuel cell support member 44 includes a first support section 44a for applying a load to the sandwiching section 35 in the stacking direction at a position corresponding to the electrolyte electrode assemblies 20, and a second support section 44b for applying a load to the reactant gas supply sections 37 in the stacking direction. The density of the first support section 44a is smaller than the density of the second support section 44b.

Specifically, the fuel cell support member 44 includes an alumina layer 52 and a first composite layer 54a of the first support section 44a, and a second composite layer 54b of the second support section 44b. The first composite layer 54a and the second composite layer 54b are combined together to form a rectangular shape as a whole. At the center of the rectangular fuel cell support member 44, the first composite layer 54a corresponding to the shape of the electrolyte electrode assembly 20 is provided, and the second composite layer 54b having a frame shape corresponding to the reactant gas supply section 37 is provided around the first composite layer 54a.

The alumina layer 52 includes alumina fiber. Specifically, the alumina layer 52 is formed by impregnating crystalline alumina fiber with an organic binder for compression in the thickness direction, and removing solvent portion of the organic binder by drying. The alumina layer 52 containing the alumina fiber has elasticity, good durability at high temperature and heat insulating property and electrically insulating property.

Each of the first composite layer 54a and the second composite layer 54b is made of composite material of alumina fiber and vermiculite. Specifically, each of the first composite layer 54a and the second composite layer 54b is formed by dispersing vermiculite particles into slurry containing crystalline alumina fiber, and produced in the same manner as the above alumina layer 52. The amount of vermiculite contained in the first composite layer 54a is smaller than the amount of vermiculite contained in the second composite layer 54b.

The electrolyte electrode assembly 20 is made of material having a relatively small heat expansion coefficient in comparison with the bolt 50 made of nickel based heat resistant alloy, for example. Therefore, even if the bolt 50 is expanded in the axial direction, the tightening load for tightening the stack body 36 does not become significantly small due to the elasticity of the alumina layer 52.

Vermiculite has property to expand to a relatively large extent at high temperature. The expansion coefficient of this vermiculite is larger than the expansion coefficient of the bolt 50. Therefore, in particular, at high temperature, the tightening load for tightening the stack body 36 does not become significantly small. Also, since the amount of vermiculite contained in the first composite layer 54a is smaller than the amount of vermiculite contained in the second composite layer 54b, the load applied to the electrolyte electrode assembly 20 in the stacking direction is smaller than the load applied to the reactant gas supply section 37 in the stacking direction.

The alumina layer 52 is provided adjacent to the stack body 36, i.e., adjacent to the upper end plate 42. The first composite layer 54a and the second composite layer 54b are provided adjacent to the load plate 46.

At the time of assembling the fuel cell stack 10, after the stack body 36 is stacked on the lower end plate 38, the upper end plate 42 is stacked on the stack body 36. After the alumina layer 52 having a predetermined thickness and the first and second composite layers 54a, 54b each having a predetermined thickness are placed on the upper end plate 42, the load plate 46 is provided on the first and second composite layers 54a, 54b.

Then, the bolts 50 are inserted into the respective holes 48 of the load plate 46. Front ends of the bolts 50 are screwed into the screw holes 40 of the lower end plate 38. In the structure, the load in the stacking direction is applied to the stack body 36, and a compression load is applied to the fuel cell support member 44.

In the fuel cell support member 44, the alumina layer 52 and the first and second composite layers 54a, 54b are compressed. After the fuel cell support member 44 applies a tightening load to generate a surface pressure required for the stack body 36, tightening of the bolts 50 is finished, and operation of assembling the fuel cell stack 10 is completed.

Operation of the fuel cell stack 10 will be described below.

As shown in FIG. 2, a fuel gas (e.g., hydrogen gas) and an oxygen-containing gas (e.g., air) are supplied to the lower end plate 38 of the fuel cell stack 10 through the manifolds (not shown). The air flows vertically upward along the oxygen-containing gas supply passages 26a.

In each of the solid oxide fuel cells 12, as shown in FIG. 3, the air flows through the inlet connection channels 34a of the seal member 24a connected to the oxygen-containing gas supply passages 26a, and then, the air is supplied to the oxygen-containing gas channel 30 of the separator 22. The air flows through the oxygen-containing gas channel 30 in the direction indicated by the arrow A, and the air is supplied to the cathode 16 of the electrolyte electrode assembly 20. Then, the air is discharged into the oxygen-containing gas discharge passage 26b.

The fuel gas flows vertically upward along the fuel gas supply passages 28a, and the fuel gas is supplied to the fuel gas channel 32 of the separator 22 of each solid oxide fuel cell 12. The fuel gas flows in the direction indicated by the arrow B along the fuel gas channel 32, and the fuel gas is supplied to the anode 18 of the electrolyte electrode assembly 20. Then, the fuel gas is discharged to the fuel gas discharge passage 28b.

Thus, in the electrolyte electrode assembly 20, the fuel gas is supplied to the anode 18, and the air is supplied to the cathode 16. Thus, oxide ions flow through the electrolyte 14 toward the anode 18 for generating electricity by electrochemical reactions.

In the first embodiment, the fuel cell support member 44 is interposed between the upper end plate 42 and the load plate 46, and the fuel cell support member 44 includes the alumina layer 52 and the first and second composite layers 54a, 54b.

The first and second composite layers 54a, 54b include alumina fiber with elasticity, having good durability at high temperature, good heat insulating property, and good electrical insulating property. Further, the first and second composite layers 54a, 54b include vermiculite having a high heat expansion coefficient at high temperature. Therefore, the first and second composite layers 54a, 54b has good heat resistance property, good heat insulating property, and good heat expansion property, and it becomes possible to reliably apply the desired tightening load to the stack body 36 because the tightening load can be easily adjusted in correspondence with the change in the temperature of the fuel cell stack 10. Thus, the stacking load applied to the fuel cell stack 10 is stabilized, and improvement in the power generation performance is achieved.

Specifically, the bolt 50 is made of material having a large linear expansion coefficient such as nickel based heat resistant alloy. The heat expansion of the bolt 50 is considerably large in comparison with the electrolyte electrode assembly 20. Therefore, at high temperature, the bolt 50 is expanded in the stacking direction to a greater extent in comparison with the stack body 36. Therefore, the tightening load applied to the stack body 36 tends to be small.

At high temperature, heat expansion of vermiculite is large in comparison with the heat expansion of the bolt 50 in the axial direction. Therefore, it becomes possible to suitably suppress reduction in the tightening load applied to the stack body 36.

Further, the density of the first support section 44a for applying a desired load P1 to the sandwiching sections 35 in the stacking direction at the position corresponding to the electrolyte electrode assemblies 20 is smaller than the density of the second support section 44b for supplying the desired load P2 (P1<P2) to the reactant gas supply sections 37 in the stacking direction.

Further, heat radiation from the fuel cell stack 10 is suitably suppressed, and thermally self-sustaining operation can be facilitated. The thermally self-sustaining operation herein means suitable operation of the fuel cell only using the heat generated by the fuel cell, without requiring any heat supplied from the outside.

In the structure, since a relatively large load is applied to the reactant gas supply section 37, the desired sealing performance of the reactant gas supply section 37 is maintained. In the meanwhile, a relatively small load enough to achieve tight contact between the electrolyte electrode assemblies 20 and the sandwiching sections 35 is applied to the electrolyte electrode assemblies 20. Therefore, damages of the electrolyte electrode assemblies 20 can be prevented as much as possible, and power generation and current collection can be performed efficiently.

Thus, with simple and compact structure, the desired tightening load is reliably applied to each of different portions of the solid oxide fuel cell 12, and heat radiation is suppressed. Accordingly, it becomes possible to provide the fuel cell stack 10 which carries out highly efficient power generation.

Further, in the first embodiment, the amount of vermiculite contained in the first composite layer 54a of the first support section 44a is smaller than the amount of vermiculite contained in the second composite layer 54b of the second support section 44b. In the structure, at high temperature, the expansion coefficient of the first support section 44a is small in comparison with the second support section 44b. Thus, no excessive load is applied to the electrolyte electrode assemblies 20. Accordingly, tight contact between the electrolyte electrode assemblies 20 and the separators 22 is achieved desirably. Further, damages of the electrolyte electrode assemblies 20 can be prevented as much as possible, and power generation and current collection can be performed efficiently.

Further, the fuel cell support member 44 includes the alumina layer 52 made of alumina fiber, and the first composite layer 54a and the second composite layer 54b made of composite material. The alumina layer 52 is provided adjacent to the stack body 36. The first composite layer 54a and the second composite layer 54b are provided adjacent to the load plate 46.

The alumina fiber is elastic, and has good heat durability at high temperature. Further, alumina fiber has good heat insulating property and good electrical insulating property. Therefore, the alumina layer 52 can be suitably provided at the end of the stack body 36 operated at high temperature.

Though vermiculite has poor durability at high temperature in comparison with alumina fiber, vermiculite has a high heat expansion coefficient at high temperature. Therefore, by providing the first composite layer 54a and the second composite layer 54b adjacent to the load plate 46, vermiculite is not directly exposed to the hot stack body 36. Further, since vermiculite is expanded by heat, the tightening load applied by the first composite layer 54a and the second composite layer 54b can be easily adjusted in correspondence with the change in the temperature of the fuel cell stack 10. Thus, it becomes possible to reliably apply the desired tightening load to the stack body 36.

Further, the load plate 46 is a plate member provided in parallel with the lower end plate 38. The load plate 46 and the lower end plate 38 are tightly fastened in the stacking direction by the bolts 50.

Therefore, even if the bolts 50 themselves are expanded in the axial direction due to the high temperature, the first composite layer 54a and the second composite layer 54b are expanded, and the desired tightening load can be reliably applied to each of the solid oxide fuel cells 12. Thus, improvement in the power generation performance of the entire fuel cell stack 10 is achieved easily.

Further, electrolyte electrode assembly 20 is an anode support type cell in which the thickness of the anode 18 is larger than the thickness of the cathode 16 and the electrolyte 14. The surface area of the cathode 16 is smaller than the surface area of the electrolyte 14.

In the structure, since the thickness of the outer ends of the electrolyte electrode assemblies 20 is small, influence of the load on the electrolyte electrode assemblies 20 by the second support section 44b is reduced. Thus, damages of the electrolyte electrode assemblies 20 can be prevented as much as possible, and improvement in the durability of the electrolyte electrode assemblies 20 is achieved.

Alternatively, instead of adopting the anode support type cell as the electrolyte electrode assemblies 20, it is possible to adopt an electrolyte support type cell in which thickness of the electrolyte 14 is larger than the thickness of the anode 18 and the cathode 16. At least the surface area of the anode 18 or the surface area of the cathode 16 may be smaller than the surface area of the electrolyte 14.

In the structure, since the thickness of the outer ends of the electrolyte electrode assembly 20 is small, influence of the load on the electrolyte electrode assemblies 20 by the second support section 44b is reduced. Thus, damages of the electrolyte electrode assemblies 20 can be prevented as much as possible, and improvement in the durability of the electrolyte electrode assemblies 20 is achieved.

Further, the fuel cell stack 10 is formed by stacking the solid oxide fuel cells 12 in the form of flat plates. Therefore, in particular, the solid oxide fuel cells 12 can be used effectively for high temperature fuel cells such as the flat plate type solid oxide fuel cells.

Figure 4:
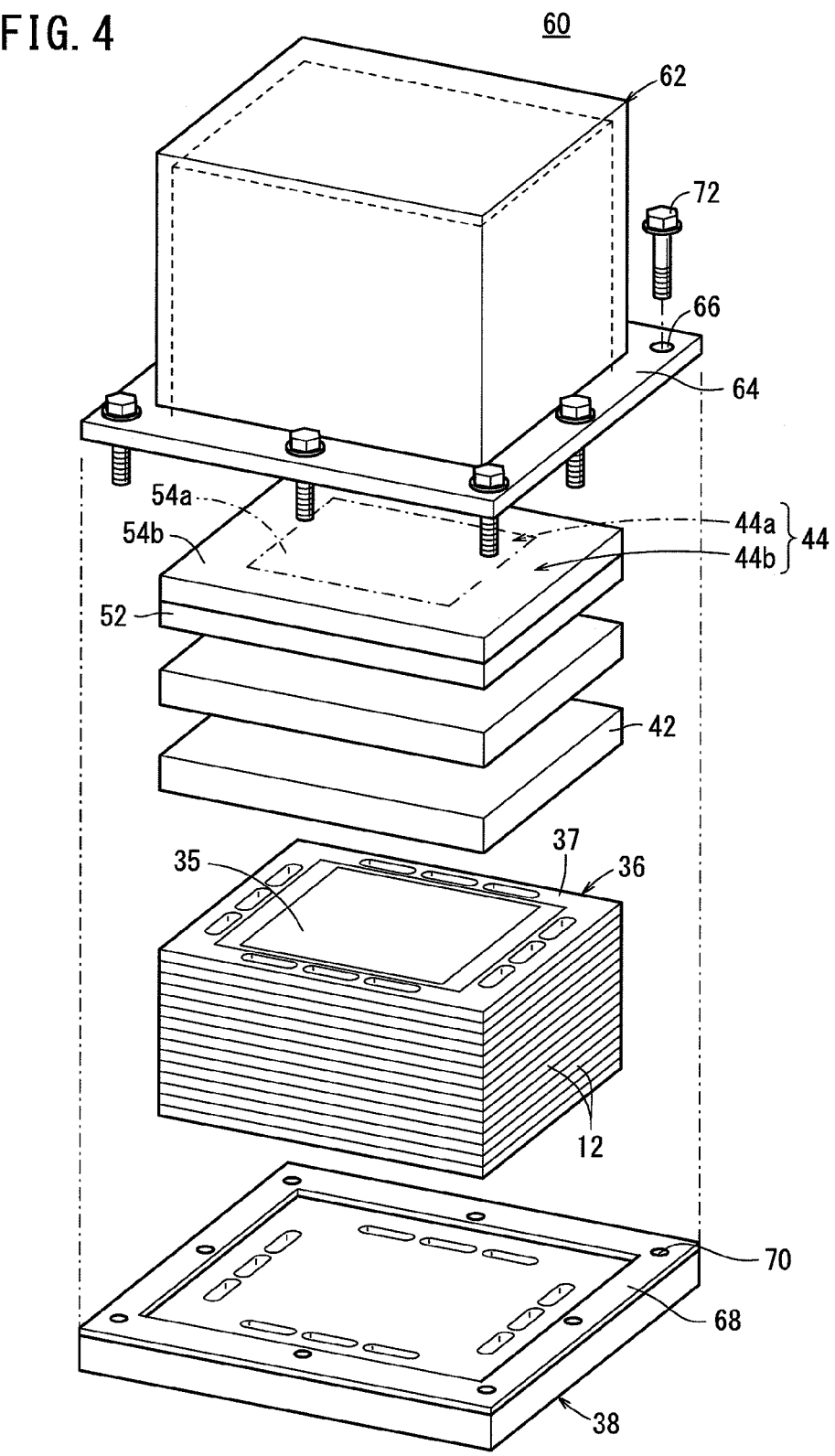
FIG. 4 is a partially-exploded perspective view showing a fuel cell stack according to a second embodiment of the present invention.

FIG. 4 is a partially-exploded perspective view showing a fuel cell stack 60 according to a second embodiment of the present invention.

The constituent elements that are identical to those of the fuel cell stack 10 according to the first embodiment are labeled with the same reference numerals, and description thereof will be omitted. Also in a third and other embodiments as described later, the constituent elements that are identical to those of the fuel cell stack 10 according to the first embodiment are labeled with the same reference numerals, and description thereof will be omitted. In second and other embodiments described later, boxes are used as mounting members. However, the present invention is not limited in this respect. The load plate 46 and the bolts 50 according to the first embodiment may be adopted as well in the second and other embodiments.

Figure 5:
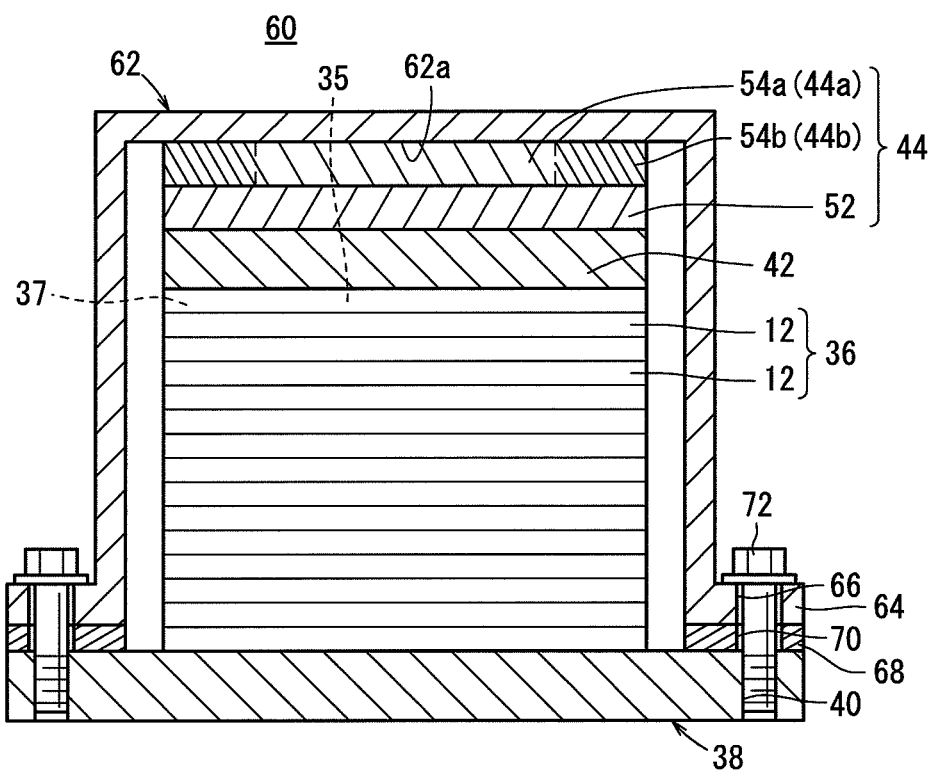
FIG. 5 is a cross sectional view schematically showing the fuel cell stack.

As shown in FIGS. 4 and 5, the fuel cell stack 60 includes a box 62 instead of the load plate 46 according to the first embodiment. For example, the box 62 is made of ferrite stainless material. At an end adjacent to the opening, a flange 64 protruding to the outside is provided, and a plurality of holes 66 are formed in the flange 64.

The stack body 36 is provided on the lower end plate through a seal member 68. The seal member 68 has a frame shape, and a plurality of holes 70 are formed in the seal member 68 coaxially with the holes 66.

Bolts 72 are inserted into the holes 66, 70, and the bolts 72 are screwed into the screw holes 40 of the lower end plate 38 such that the bottom (mounting member) 62a of the box 62 presses the fuel cell support member 44 in the stacking direction.

In the second embodiment, the heat expansion coefficient of vermiculite of the first and second composite layers 54a, 54b is larger than the heat expansion coefficient of the box 62. Therefore, it becomes possible to suitably suppress reduction in the tightening load applied to the stack body 36 due to the expansion of the box 62 at high temperature. Thus, the same advantages as in the case of the first embodiment are obtained. For example, the desired tightening load is reliably applied to each of the desired portions of the stack body 36, and improvement in the power generation performance of the entire fuel cell stack 60 is achieved easily.

Further, in the second embodiment, the box 62 is made of ferrite stainless material. The ferrite stainless material is inexpensive, and has a small linear expansion coefficient. Therefore, the difference in the heat expansion between the box 62 and the stack body 36 becomes small, and further reduction in the load at high temperature is achieved. Moreover, the amount of heat resistant alloy used for the fuel cell stack 60 can be reduced, and the fuel cell stack 60 can be produced economically.

Figure 6:
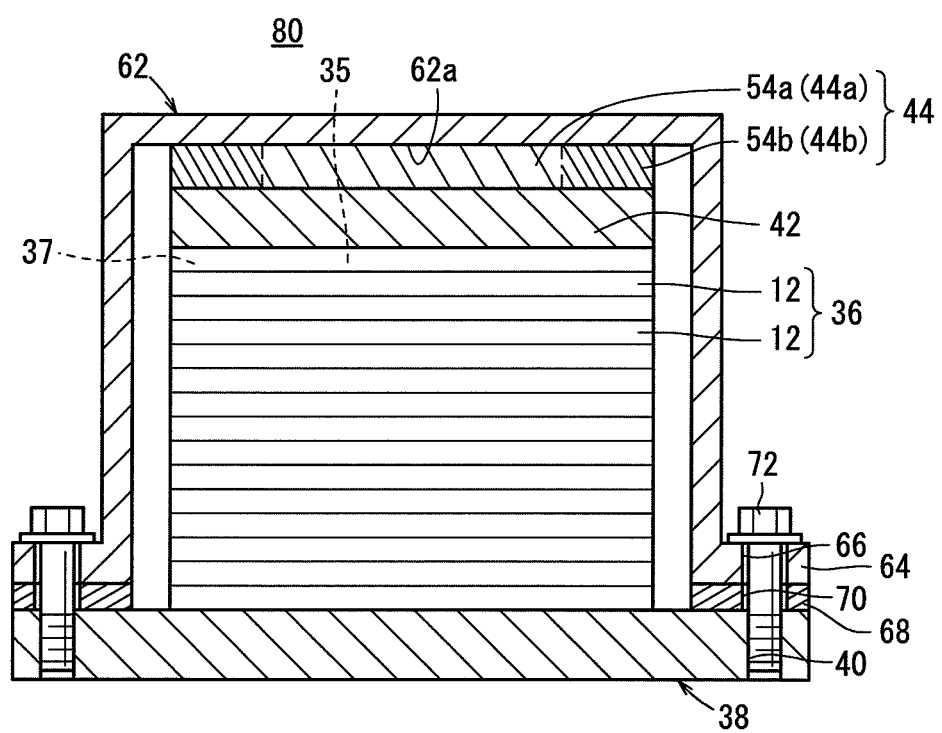
FIG. 6 is a cross sectional view schematically showing a fuel cell stack according to a third embodiment of the present invention.

FIG. 6 is a cross sectional view schematically showing a fuel cell stack 80 according to a third embodiment of the present invention.

The fuel cell stack 80 does not use the alumina layer 52. Composite material (made up of the first composite layer 54a and the second composite layer 54b) is directly placed on the upper end plate 42. Thus, in the third embodiment, the same advantages as in the case of the second embodiment are obtained.

It should be noted that the alumina layer 52 may not be provided also in the first embodiment. In fourth and other embodiments as described later, the alumina layer 52 may not be provided as well.

Figure 7:
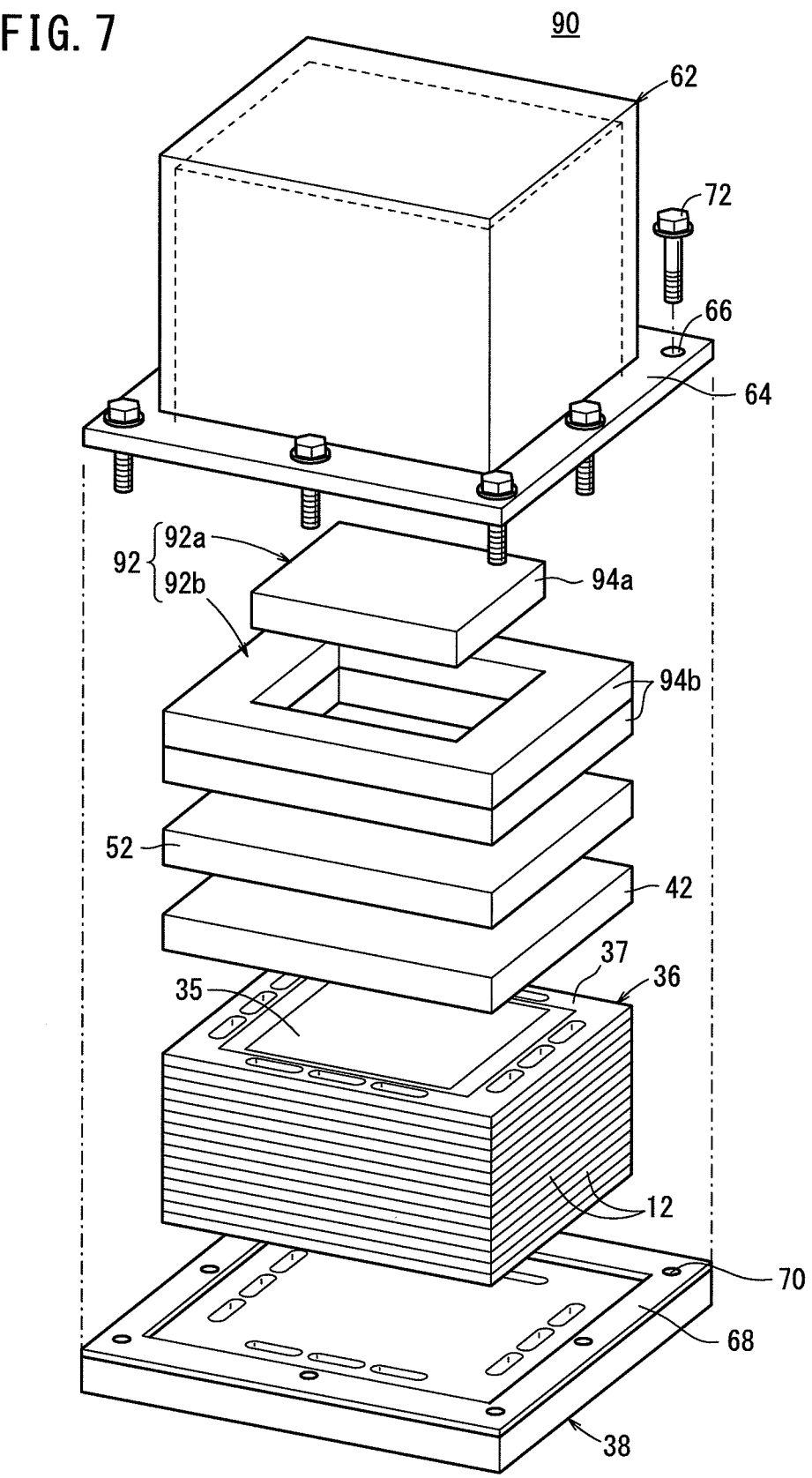
FIG. 7 is a partially-exploded perspective view showing a fuel cell stack according to a fourth embodiment of the present invention.

FIG. 7 is a partial exploded perspective view showing a fuel cell stack 90 according to a fourth embodiment of the present invention.

Figure 8:
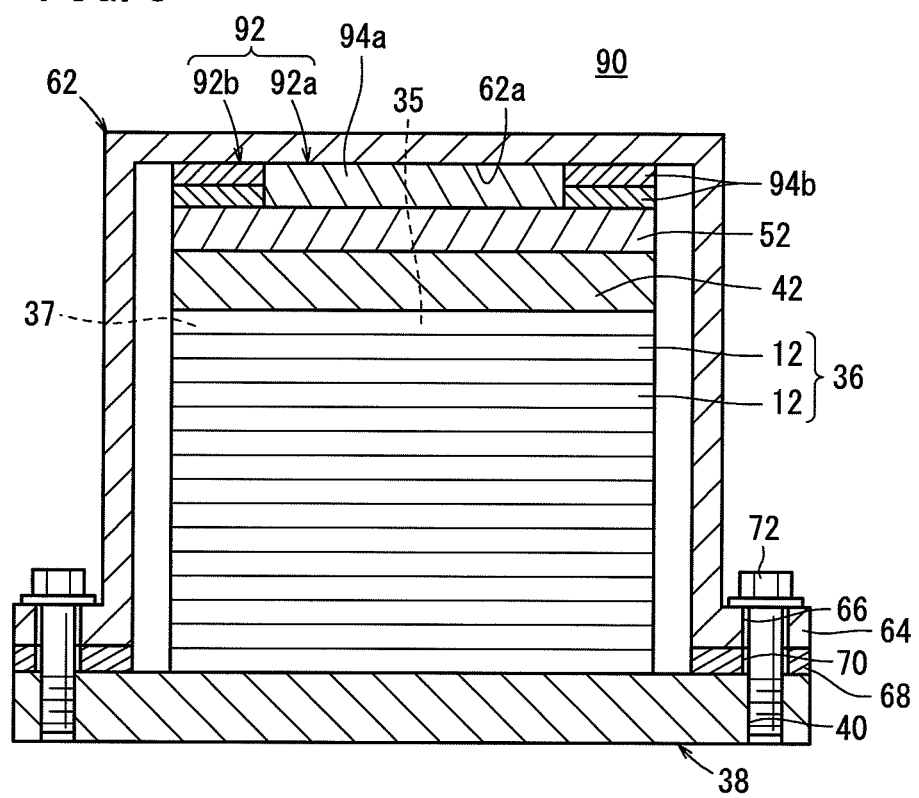
FIG. 8 is a cross sectional view schematically showing the fuel cell stack.

As shown in FIGS. 7 and 8, in the fuel cell stack 90, a fuel cell support member 92 and the bottom 62a of a box 62 are stacked above the upper end plate 42. The fuel cell support member 92 includes a first support section 92a for applying a load to the sandwiching sections 35 in the stacking direction at a position corresponding to the electrolyte electrode assemblies 20, and a second support section 92b for applying a load to the reactant gas supply sections 37 in the stacking direction. The density of the first support section 92a is smaller than the density of the second support section 92b.

The first support section 92a includes a first composite layer 94a corresponding to the shape of the electrolyte electrode assembly 20. The second support section 92b contains the first composite layer 94a, and includes two frame shaped second composite layers 94b corresponding to the reactant gas supply section 37.

In the state where no external load is applied to the first composite layer 94a and the two second composite layers 94b, the first composite layer 94a and the second composite layers 94b have different heights. In the state where the stack body 36 is placed in the box 62, the first composite layer 94a and the two second composite layers 94b are compressed to have the same thickness. That is, the first composite layer 94a applies a desired load P1 to the sandwiching sections 35 in the stacking direction at the position corresponding to the electrolyte electrode assemblies 20. The second composite layers 94b compressed to a greater extent in comparison with the first composite layer 94a applies a desired load P2 (P1<P2) to the reactant gas supply sections 37 in the stacking direction.

As described above, in the fourth embodiment, the density of the first support section 92a which applies the desired load P1 to the sandwiching sections 35 in the stacking direction at the position corresponding to the electrolyte electrode assemblies 20 is smaller than the density of the second support section 92b which applies the desired load P2 (P1<P2) to the reactant gas supply sections 37 in the stacking direction.

Thus, with simple and compact structure, the same advantages as in the cases of the first to third embodiments are obtained. For example, the desired tightening load is reliably applied to each of different portions of the solid oxide fuel cell 12, and heat radiation is suppressed. Accordingly, it becomes possible to carry out highly efficient power generation. Further, since it is sufficient to provide the one first composite layer 94a and the two second composite layers 94b separately, structure and operation can be simplified easily. In the fourth embodiment, the two composite layers 94b are stacked together to form a stack. Instead of using the two composite layers 94b, three or more composite layers may be stacked together to form a stack, or only one thick composite layer may be used.

Figure 9:
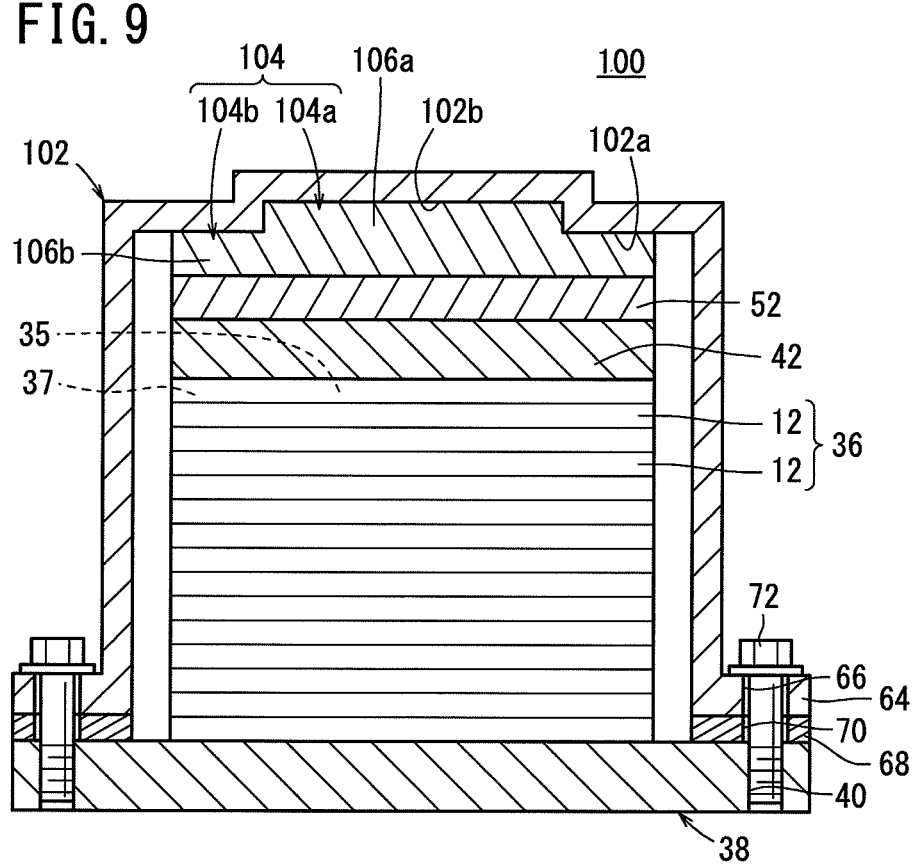
FIG. 9 is a cross sectional view schematically showing a fuel cell stack according to a fifth embodiment of the present invention.

FIG. 9 is a cross sectional view schematically showing a fuel cell stack 100 according to a fifth embodiment of the present invention.

The fuel cell stack 100 includes a box 102. A fuel cell support member 104 is provided in the box 102. A recess 102b corresponding to the shape of the electrolyte electrode assembly 20 is formed at the bottom 102a of the box 102. The bottom 102a and the recess 102b form a mounting member.

The fuel cell support member 104 includes a first support section 104a for applying a load to the sandwiching sections 35 in the stacking direction at the position corresponding to the electrolyte electrode assemblies 20 and a second support section 104b for applying a load to the reactant gas supply sections 37 in the stacking direction. The density of the first support section 104a is smaller than the density of the second support section 104b.

The first support section 104a includes a first composite layer 106a, and the second support section 104b includes a second composite layer 106b. In the state where no external load is applied to the first composite layer 106a and the second composite layer 106b, the first composite layer 106a and the second composite layer 106b have the same height. In the state where the stack body 36 is placed in the box 102, the first composite layer 106a and the second composite layer 106b are compressed to have different thicknesses.

That is, since the first composite layer 106a is placed in the recess 102b of the box 102, the first composite layer 106a is compressed to a smaller extent in comparison with the second composite layer 106b, and the density of the first support section 104a is smaller than the density of the second support section 104b.

In the structure, the first composite layer 106a applies a desired load P1 to the sandwiching sections 35 in the stacking direction at the position corresponding to the electrolyte electrode assemblies 20, and the second composite layer 106b applies a desired load P2 (P1<P2) to the reactant gas supply sections 37 in the stacking direction.

As described above, in the fifth embodiment, the density of the first support section 104a which applies the desired load P1 to the sandwiching sections 35 in the stacking direction at the position corresponding to electrolyte electrode assemblies 20 is smaller than the density of the second support section 104b which applies the desired load P2 (P1<P2) to the reactant gas supply sections 37 in the stacking direction.

Thus, with simple and compact structure, the same advantages as in the cases of the first to fourth embodiments are obtained. For example, the desired tightening load is reliably applied to each of different portions of the solid oxide fuel cell 12, and heat radiation is suppressed. Accordingly, it becomes possible to carry out highly efficient power generation.

Figure 10:
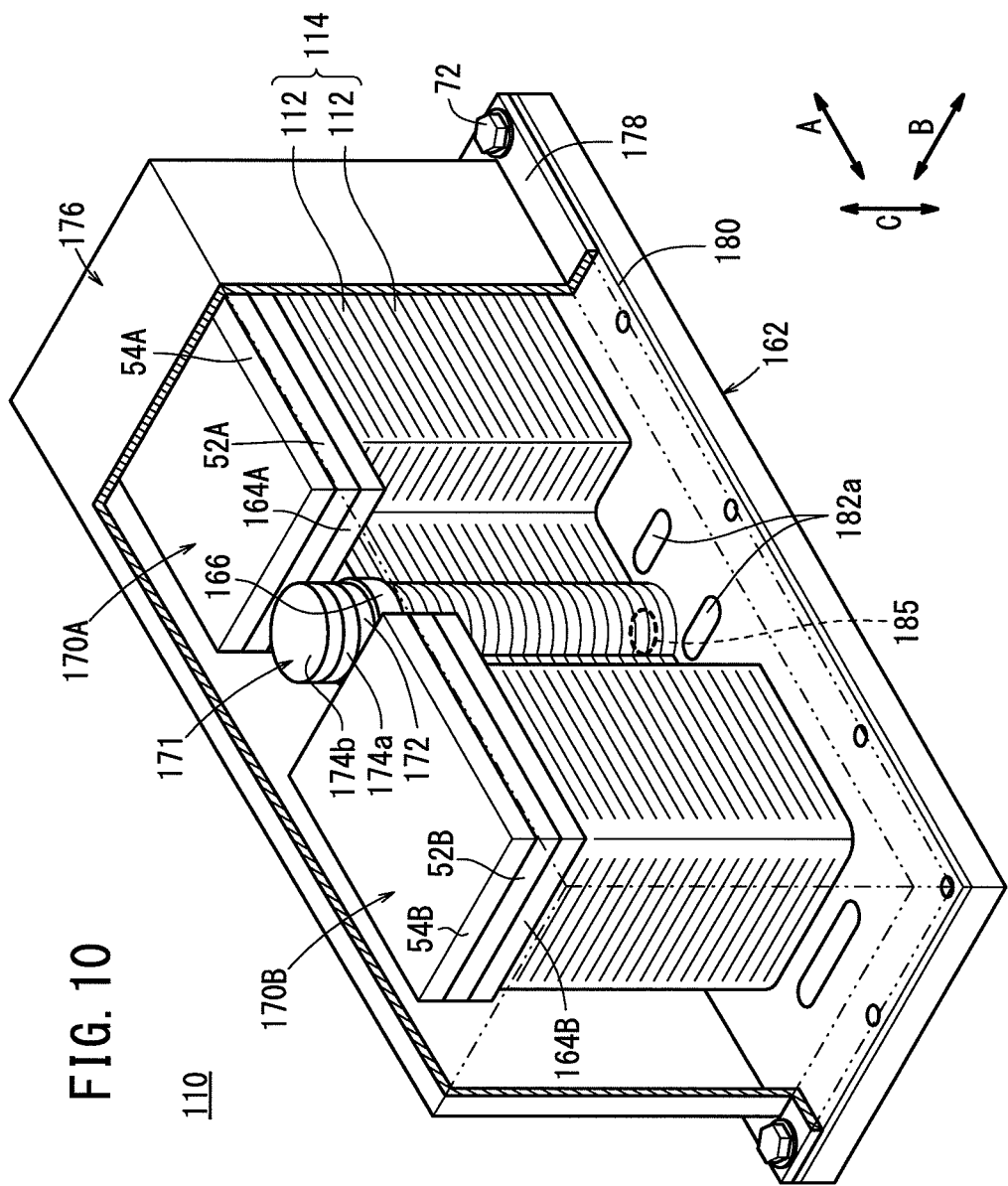
FIG. 10 is a perspective view schematically showing a fuel cell stack according to a sixth embodiment of the present invention.

FIG. 10 is a perspective view schematically showing a fuel cell stack 110 according to a sixth embodiment of the present invention.

Figure 11:
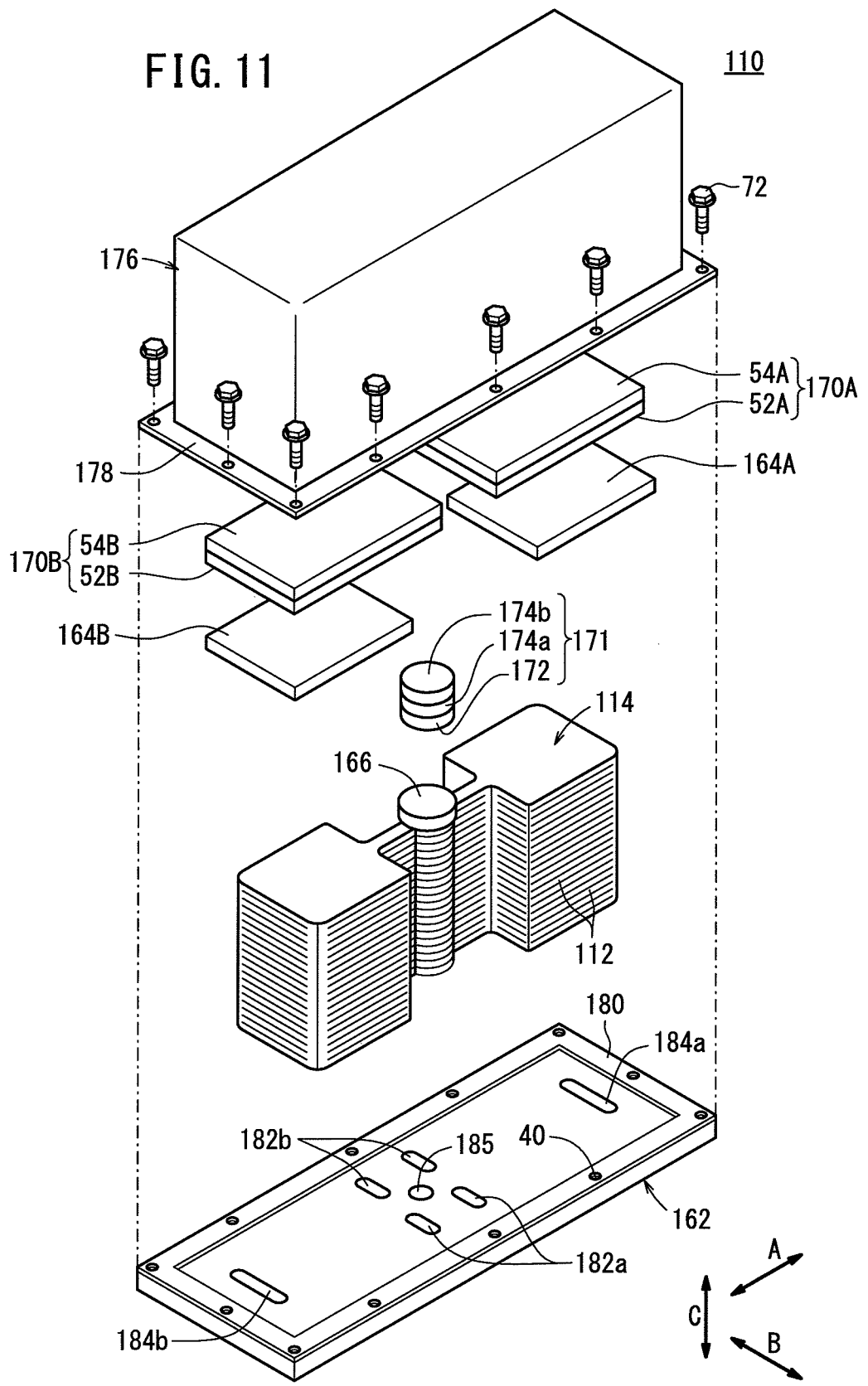
FIG. 11 is a partially-exploded perspective view showing the fuel cell stack.

As shown in FIGS. 10 and 11, the fuel cell stack 110 includes a plurality of solid oxide fuel cells 112 stacked in a direction indicated by an arrow C. A plurality of the solid oxide fuel cells 112 are stacked in a vertical direction indicated by the arrow C together to form a stack body 114.

Figure 12:
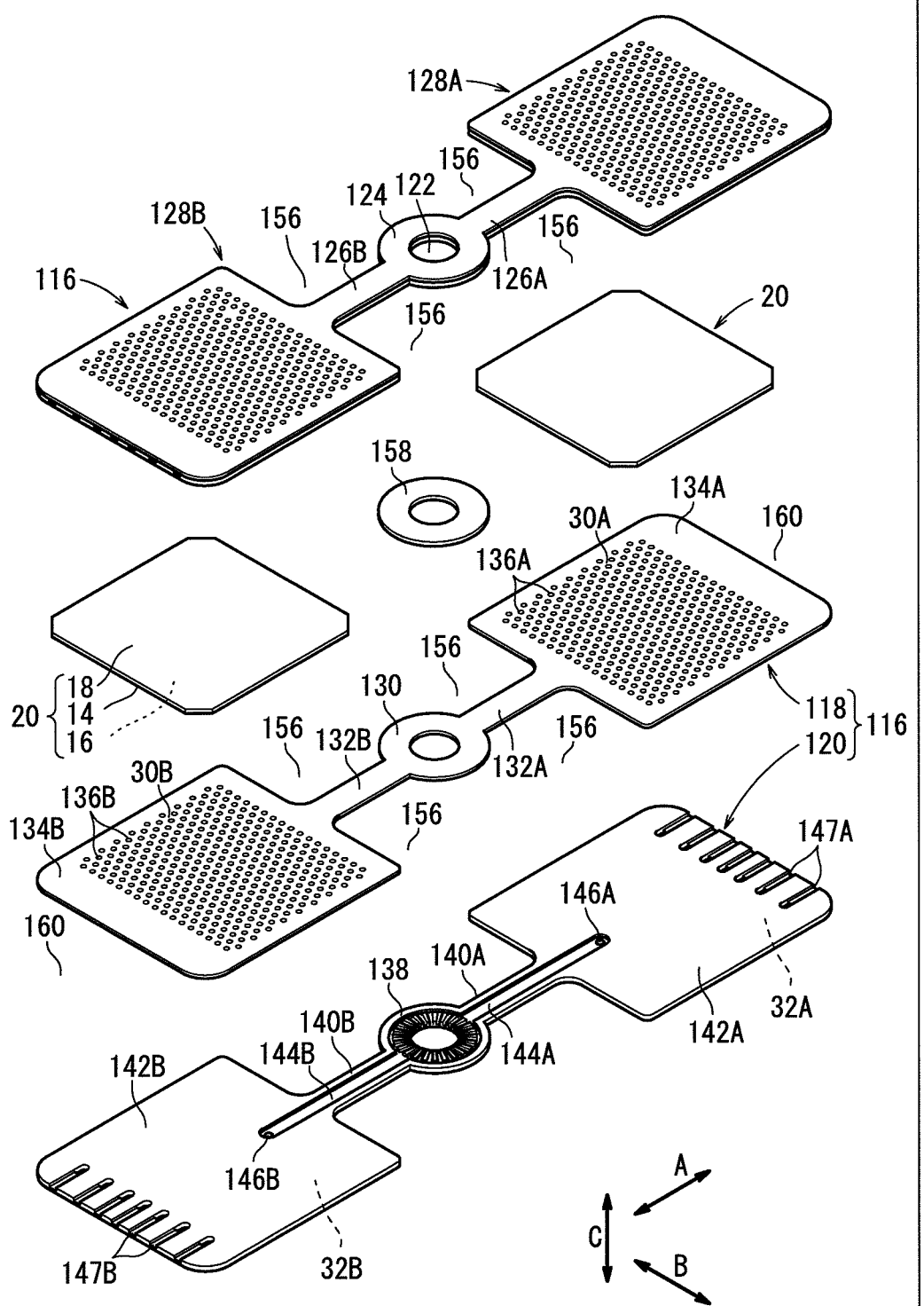
FIG. 12 is an exploded perspective view showing a solid oxide fuel cell of the fuel cell stack.

As shown in FIG. 12, the solid oxide fuel cell 112 includes a pair of separators 116 sandwiching two electrolyte electrode assemblies 20 positioned in the same plane. The electrolyte electrode assemblies 20 comprise anode support type cells or electrolyte support type cells. The separator 116 includes a first plate 118 and a second plate 120. For example, the first plate 118 and the second plate 120 are metal plates of stainless alloy or the like, and are joined to each other, e.g., by brazing, diffusion bonding, or laser welding.

The separator 116 has a fuel gas supply section (reactant gas supply section) 124, and a fuel gas supply passage 122 extends through the center of the fuel gas supply section 124. A pair of bridge sections 126A, 126B are connected to the fuel gas supply section 124, and the bridge sections 126A, 126B extend in directions opposite to each other. Sandwiching sections 128A, 128B are provided integrally with the pair of bridge sections 126A, 126B at symmetrical positions with respect to the fuel gas supply section 124 positioned at the center.

The first plate 118 includes a first circular disk 130, and the fuel gas supply passage 122 extends through the first circular disk 130. First long plates 132A, 132B are provided integrally with the first circular disk 130. The first long plates 132A, 132B extend from the first circular disk 130 in directions opposite to each other. First rectangular sections 134A, 134B are provided integrally with the first long plates 132A, 132B. A plurality of protrusions 136A, 136B are formed on surfaces of the first rectangular sections 134A, 134B facing the cathodes 16. Oxygen-containing gas channels 30A, 30B are formed by the protrusions 136A, 136B, respectively.

The second plate 120 has a second circular disk 138, and the fuel gas supply passage 122 extends through the center of the second circular disk 138. Second long plates 140A, 140B are provided integrally with the second circular disk 138, and the second long plates 140A, 140B extend from the second circular disk 138 in directions opposite to each other. Second rectangular sections 142A, 142B are provided integrally with the second long plates 140A, 140B, respectively.

Fuel gas supply channels 144A, 144B are formed to extend from the second long plates 140A, 140B to the second rectangular sections 142A, 142B. Fuel gas inlets 146A, 146B are formed at positions where the fuel gas supply channels 144A, 144B are terminated. A plurality of fuel gas outlets 147A, 147B are formed on surfaces of the second rectangular sections 142A, 142B where the fuel gas supply channels 144A, 144B are formed.

Figure 13:
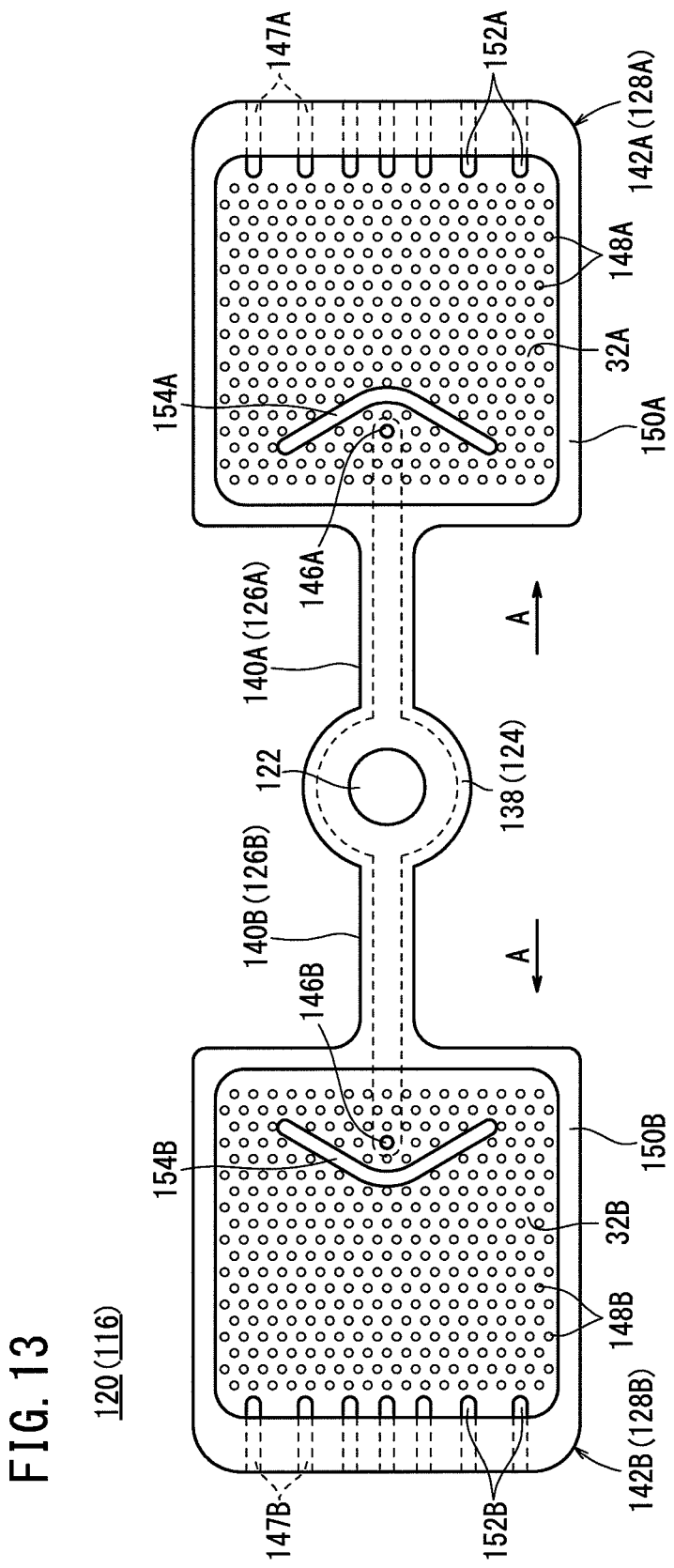
FIG. 13 is a view showing a second plate of the solid oxide fuel cell.

As shown in FIG. 13, a plurality of protrusions 148A, 148B are formed on surfaces of the second rectangular sections 142A, 142B which contact the anodes 18. Fuel gas channels 32A, 32B are formed by the protrusions 148A, 148B. The fuel gas channels 32A, 32B are surrounded by outer protrusions 150A, 150B, and through holes 152A, 152B connected to the fuel gas outlets 147A, 147B are formed in the fuel gas channels 32A, 32B. V-shaped detour path forming walls 154A, 154B are formed between the fuel gas inlets 146A, 146B and the fuel gas outlets 147A, 147B, respectively.

As shown in FIG. 12, oxygen-containing gas supply passages 156 are formed on both sides of the bridge sections 126A, 126B for supplying an oxygen-containing gas in the direction indicated by the arrow C. For example, the oxygen-containing gas flows vertically upward, and the oxygen-containing gas is supplied along the oxygen-containing gas channels 30A, 30B of each solid oxide fuel cell 112 in the direction indicated by the arrow A.

In a pair of separators 116 sandwiching the electrolyte electrode assemblies 20, an insulating seal 158 for sealing the fuel gas supply passage 122 is provided in each space between the fuel gas supply sections 124. For example, mica material, ceramic material or the like, i.e., crustal component material, glass material, and composite material of clay and plastic may be used for the insulating seal 158.

In each solid oxide fuel cell 112, exhaust gas discharge passages 160 are formed around the sandwiching sections 128A, 128B, on the outside in the direction indicated by the arrow A. The fuel gas and the oxygen-containing gas partially consumed in the reaction in the electrolyte electrode assembly 20 are discharged as the exhaust gas from the exhaust gas discharge passages 160 in the stacking direction.

As shown in FIGS. 10 and 11, the fuel cell stack 110 includes a lower end plate 162 provided at a lower end (one end) in the stacking direction of the stack body 114, upper end plates 164A, 164B provided at positions corresponding to the sandwiching sections 128A, 128B, at an upper end (the other end) of the stack body 114 in the stacking direction, and a fuel seal plate 166 provided at a position corresponding to the fuel gas supply section 124.

First support members 170A, 170B are placed on the upper end plates 164A, 164B, and a second support member 171 is positioned on the fuel seal plate 166. These components form the fuel cell support member as a whole.

The second support member 171 includes an alumina layer 172 adjacent to the fuel seal plate 166, and composite layers 174a, 174b stacked on the alumina layer 172. The alumina layer 172 and the composite layers 174a, 174b have a circular disk shape corresponding to the fuel seal plate 166.

The first support members 170A, 170B include alumina layers 52A, 52B placed on the upper end plates 164A, 164B, and composite layers 54A, 54B stacked on the alumina layers 52A, 52B.

The alumina layers 172, 52A, 52B have structure identical to that of the alumina layer 52. The composite layers 174a, 174b, 54A, 54B have structure identical to that of the first composite layer 54a.

The second support member 171 includes two composite layers 174a, 174b, for allowing a large load to be applied in the stacking direction indicated by the arrow C, in comparison with the first support members 170A, 170B. The overall thickness of the composite layers 174a, 174b is larger than the thickness of each of the composite layers 54A, 54B.

The fuel cell stack 110 has a box 176, and a flange 178 is formed at an end of the opening of the box 176, and a seal member 180 is interposed between the flange 178 and the lower end plate 162. The flange 178 and the lower end plate 162 are fixed together using a plurality of bolts 72.

Figure 14:
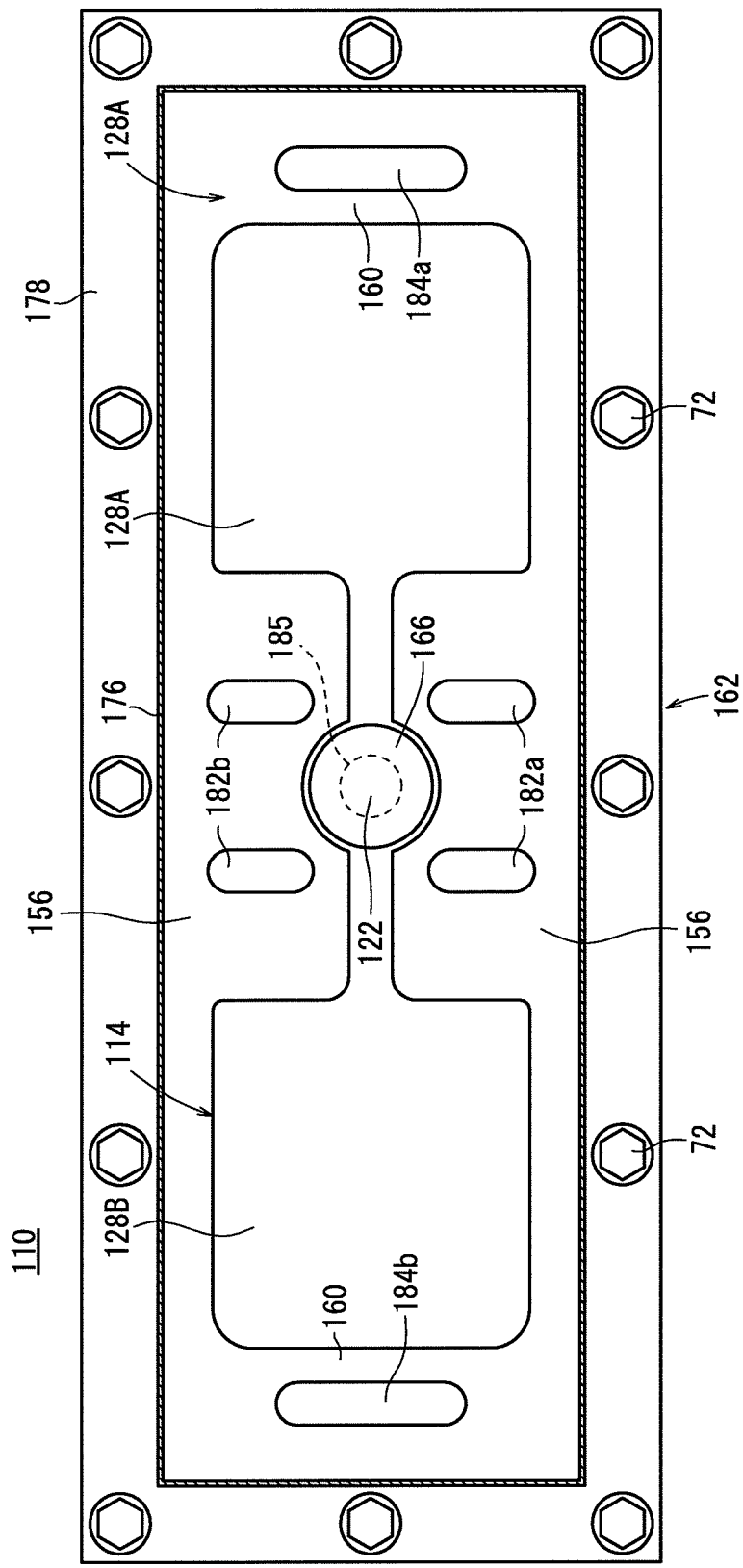
FIG. 14 is a plan view, partially in cross section, showing the fuel cell stack.

As shown in FIG. 14, two air holes 182a and two air holes 182b connected to the oxygen-containing gas supply passage 156, and two exhaust gas holes 184a, 184b connected to the exhaust gas discharge passages 160 are formed in the lower end plate 162. Further, one fuel gas hole 185 connected to the fuel gas supply passage 122 is formed in the lower end plate 162.

Operation of the fuel cell stack 110 will be described below.

A fuel gas is supplied from the fuel gas hole 185 of the lower end plate 162 into the fuel gas supply passage 122 of the fuel cell stack 110. The air is supplied from the air holes 182a, 182b of the lower end plate 162 into the oxygen-containing gas supply passage 156 of the fuel cell stack 110.

As shown in FIG. 12, in the separator 116 of each solid oxide fuel cell 112, the fuel gas supplied to the fuel gas supply passage 122 is supplied into the fuel gas supply channels 144A, 144B formed in the bridge sections 126A, 126B. The fuel gas from the fuel gas supply channels 144A, 144B flows through the fuel gas inlets 146A, 146B into the fuel gas channels 32A, 32B.

As shown in FIG. 13, by the guidance of the detour path forming walls 154A, 154B, the fuel gas supplied to the fuel gas channels 32A, 32B flows through the fuel gas channels 32A, 32B, and the fuel gas is supplied to the anodes 18 of the electrolyte electrode assemblies 20. Then, the fuel gas is discharged into the exhaust gas discharge passages 160 through the fuel gas outlets 147A, 147B.

The air supplied to the oxygen-containing gas supply passages 156 flows into the oxygen-containing gas channels 30A, 30B formed between the cathodes 16 of the electrolyte electrode assemblies 20 and the separator 116. Then, the oxygen-containing gas moves through the oxygen-containing gas channels 30A, 30B in the direction indicated by the arrow A, and supplied to the cathodes 16 of the electrolyte electrode assemblies 20. Then, the oxygen-containing gas is discharged into the exhaust gas discharge passage 160.

In the sixth embodiment, the second support member 171 for applying a load to the fuel gas supply section 124 in the stacking direction and the first support members 170A, 170B for applying a load to each of the sandwiching sections 128A, 128B corresponding to the electrolyte electrode assemblies 20, in the stacking direction are provided.

The second support member 171 applies a large load in the stacking direction, in comparison with the first support members 170A, 170B. Specifically, the second support member 171 includes composite layers 174a, 174b, and the first support members 170A, 170B include composite layers 54A, 54B. The overall thickness of the composite layers 174a, 174b is larger than the thickness of each of the composite layers 54A, 54B.

In the structure, in the state where the stack body 114 is placed in the box 176, the composite layers 174a, 174b are compressed to a greater extent in comparison with the composite layers 54A, 54B. Therefore, a relatively large load is applied to the fuel gas supply sections 124. Thus, the sealing performance of the fuel gas supply section 124 is maintained suitably.

In the meanwhile, a relatively small load enough to achieve tight contact between the electrolyte electrode assemblies 20 and the sandwiching sections 128A, 128B is applied to the electrolyte electrode assemblies 20. Therefore, damages of the electrolyte electrode assemblies 20 are prevented as much as possible, and power generation and current collection can be performed efficiently.

Thus, with simple and compact structure, the same advantages as in the cases of the first to fifth embodiments are obtained. For example, the desired tightening load is reliably applied to each of different portions of the solid oxide fuel cell 112, and heat radiation is suppressed. Accordingly, it becomes possible to carry out highly efficient power generation.

Figure 15:
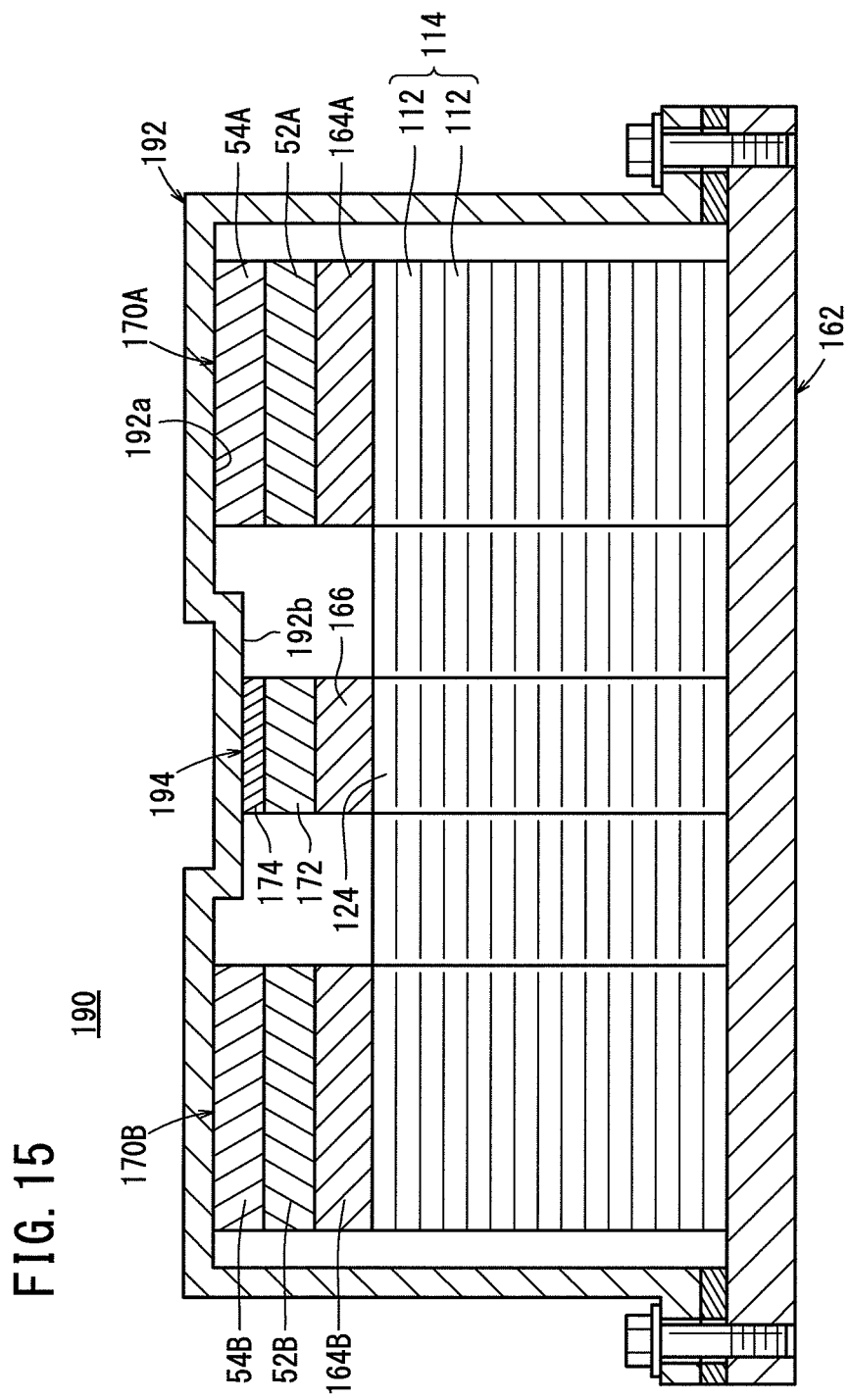
FIG. 15 is a cross sectional view schematically showing a fuel cell stack according to a seventh embodiment of the present invention.
Figure 16:
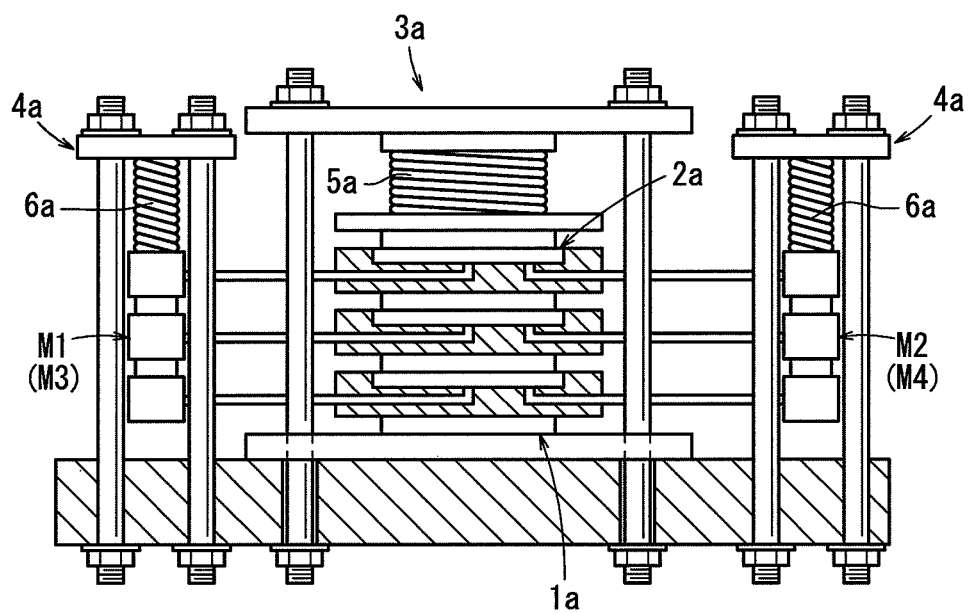
FIG. 16 is a cross sectional view showing a flat plate type solid oxide fuel cell disclosed in the conventional technique 1.
Figure 17:
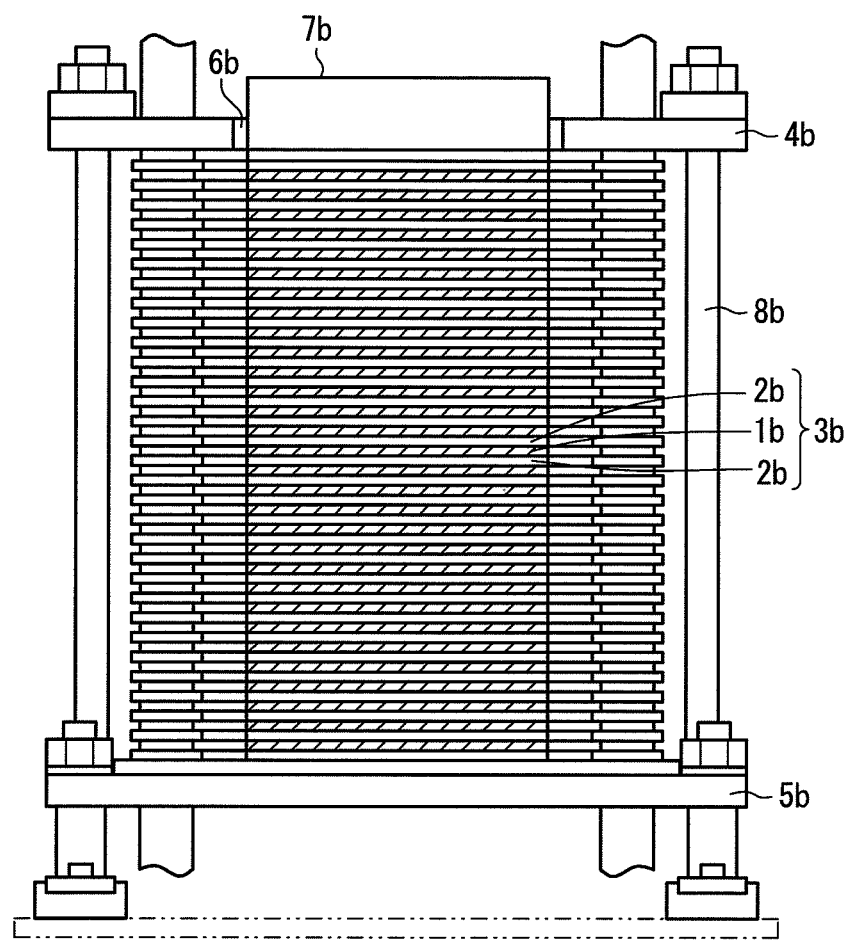
FIG. 17 is a cross sectional view showing a fuel cell disclosed in the conventional technique 2.

FIG. 15 is a cross sectional view schematically showing a fuel cell stack 190 according to a seventh embodiment of the present invention.

The fuel cell stack 190 includes a box 192. In the box 192, first support members 170A, 170B of a fuel cell support member are provided on upper end plates 164A, 164B. A second support section 194 of the fuel cell support member is provided on a fuel seal plate 166.

An expansion 192b corresponding to the shape of the electrolyte electrode assembly 20 is formed at a bottom 192a of a box 192, and the bottom 192a and the expansion 192b form a mounting member.

The second support section 194 includes a composite layer 174. In the state where no external load is applied to the composite layer 174, the thickness of the composite layer 174 is the same as the thickness of each of the composite layers 54A, 54B. When a stack body 114 is placed in the box 192, the composite layer 174 and the composite layers 54A, 54B are compressed to have different thicknesses.

That is, since the composite layer 174 is placed below the expansion 192b of the box 192, the composite layer 174 is compressed to a greater extent, and the density of the first support members 170A, 170B is smaller than the density of the second support section 194.

In the structure, the composite layers 54A, 54B apply a desired load P1 to the sandwiching sections 128A, 128B in the stacking direction at the positions corresponding to the electrolyte electrode assemblies 20, and the composite layer 174 applies a desired load P2 (P1<P2) to the reactant gas supply sections 124 in the stacking direction.

Thus, in the seventh embodiment, with simple and compact structure, the same advantages as in the cases of the first to sixth embodiments are obtained. For example, the desired tightening load is reliably applied to each of different portions of the solid oxide fuel cell 112, and heat radiation is suppressed. Accordingly, it becomes possible to carry out highly efficient power generation.

Although certain embodiments of the present invention have been shown and described in detail, it should be understood that various changes and modifications may be made to the embodiments without departing from the scope of the invention as set forth in the appended claims.

The invention claimed is:

1. A fuel cell stack including a stack body formed by stacking a plurality of solid oxide fuel cells in a stacking direction, the solid oxide fuel cells each formed by stacking an electrolyte electrode assembly between separators, the electrolyte electrode assembly including an anode, a cathode, and an electrolyte interposed between the anode and the cathode, the separator comprising:
a sandwiching section sandwiching the electrolyte electrode assembly, a fuel gas channel for supplying a fuel gas along an electrode surface of the anode, and an oxygen-containing gas channel for supplying an oxygen-containing gas along an electrode surface of the cathode being formed separately in the sandwiching section; and
a reactant gas supply section, at least a fuel gas supply passage for supplying the fuel gas to the fuel gas channel or an oxygen-containing gas supply passage for supplying the oxygen-containing gas to the oxygen-containing gas channel extending through the reactant gas supply section in the stacking direction;

the fuel cell stack comprising:
a base member provided at a first end of the stack body in the stacking direction;
a mounting member provided at a second end of the stack body in the stacking direction for applying a load to the stack body in the stacking direction;
an end plate provided between the second end of the stack body and the mounting member, with the mounting member provided at an outer position with respect to the end plate;
a fuel cell support member positioned between the mounting member and the end plate, the fuel cell support member being made of composite material of alumina fiber and vermiculite,
wherein the fuel cell support member includes a first support section for applying a load to the sandwiching section in the stacking direction at a position corresponding to the electrolyte electrode assembly, and a second support section for applying a load to the reactant gas supply section in the stacking direction; and the amount of vermiculite contained in the first support section is smaller than the amount of vermiculite contained in the second support section.

2. A fuel cell stack including a stack body formed by stacking a plurality of solid oxide fuel cells in a stacking direction, the solid oxide fuel cells each formed by stacking an electrolyte electrode assembly between separators, the electrolyte electrode assembly including an anode, a cathode, and an electrolyte interposed between the anode and the cathode, the separator comprising:
a sandwiching section sandwiching the electrolyte electrode assembly, a fuel gas channel for supplying a fuel gas along an electrode surface of the anode, and an oxygen-containing gas channel for supplying an oxygen-containing gas along an electrode surface of the cathode being formed separately in the sandwiching section;
a reactant gas supply section, at least a fuel gas supply passage for supplying the fuel gas to the fuel gas channel or an oxygen-containing gas supply passage for supplying the oxygen-containing gas to the oxygen-containing gas channel extending through the reactant gas supply section in the stacking direction;

the fuel cell stack comprising:
a base member provided at a first end of the stack body in the stacking direction;
a mounting member provided at a second end of the stack body in the stacking direction for applying a load to the stack body in the stacking direction;
an end plate provided between the second end of the stack body and the mounting member, with the mounting member provided at an outer position with respect to the end plate;
a fuel cell support member positioned between the mounting member and the end plate, the fuel cell support member being made of composite material of alumina fiber and vermiculite,
wherein the fuel cell support member includes a first support section for applying a load to the sandwiching section in the stacking direction at a position corresponding to the electrolyte electrode assembly, and a second support section for applying a load to the reactant gas supply section in the stacking direction, and
wherein the density of the composite material of the first support section is smaller than the density of the composite material of the second support section.

3. The fuel cell stack according to claim 1, wherein the fuel cell support member comprises an alumina layer made of alumina fiber and a composite layer made of the composite material, and
wherein the alumina layer is provided adjacent to the stack body, and the composite layer is provided adjacent to the mounting member.

4. The fuel cell stack according to claim 1, wherein the mounting member is a plate member provided in parallel with the base member; and
the plate member and the base member are tightened together in the stacking direction using a plurality of bolts.

5. The fuel cell stack according to claim 1, wherein the mounting member is formed by a bottom of a box containing the stack body, and an end of an opening of the box is tightened in the stacking direction using a plurality of bolts, adjacent to the base member.

6. The fuel cell stack according to claim 1, wherein the electrolyte electrode assembly is an anode support cell in which the thickness of the anode is larger than the thickness of the cathode and the electrolyte; and
the surface area of the cathode is smaller than the surface area of the electrolyte.

7. The fuel cell stack according to claim 1, wherein the electrolyte electrode assembly is an electrolyte support cell in which the thickness of the electrolyte is larger than the thickness of the anode and the cathode; and
at least the surface area of the anode or the surface area of the cathode is smaller than the surface area of the electrolyte.

8. The fuel cell stack according to claim 1, wherein the solid oxide fuel cell is a flat plate stack type solid oxide fuel cell.

* * * * *